United States Patent
Kim et al.

(10) Patent No.: US 11,526,247 B2
(45) Date of Patent: Dec. 13, 2022

(54) TOUCH DISPLAY DEVICE, TOUCH CIRCUIT AND TOUCH DRIVING METHOD THEREOF

(71) Applicant: LG DISPLAY CO., LTD., Seoul (KR)

(72) Inventors: HoonBae Kim, Seoul (KR); HyunWoo Jang, Gyeonggi-do (KR); KiYong Kim, Gyeonggi-do (KR); JaeKyu Park, Gyeonggi-do (KR); Youngwoo Jo, Gyeonggi-do (KR); SunChul Kim, Gyeonggi-do (KR); SunYeop Kim, Seoul (KR); Seongkyu Kang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/350,373

(22) Filed: Jun. 17, 2021

(65) Prior Publication Data

US 2022/0027012 A1     Jan. 27, 2022

(30) Foreign Application Priority Data

Jul. 23, 2020  (KR) .......................... 10-2020-0091717
Jul. 31, 2020  (KR) .......................... 10-2020-0096029

(51) Int. Cl.
    *G06F 3/044*        (2006.01)
    *G06F 3/041*        (2006.01)

(52) U.S. Cl.
    CPC .......... *G06F 3/0446* (2019.05); *G06F 3/0412* (2013.01); *G06F 3/0447* (2019.05); *G06F 3/04164* (2019.05)

(58) Field of Classification Search
CPC .. G06F 3/0446; G06F 3/0412; G06F 3/04164; G06F 3/0447; G06F 3/041662; G06F 3/04186; G06F 3/0443; G06F 3/04166
See application file for complete search history.

(56) References Cited

U.S. PATENT DOCUMENTS

| | | | |
|---|---|---|---|
| 8,415,959 B2* | 4/2013 | Badaye | G06F 3/0443 345/173 |
| 8,952,925 B2* | 2/2015 | Bulea | G06F 3/0418 345/174 |
| 9,052,766 B2* | 6/2015 | Dunphy | G06F 3/0443 |
| 9,052,782 B2* | 6/2015 | Bulea | G06F 3/04166 |
| 9,081,453 B2* | 7/2015 | Bulea | G06F 3/041 |

(Continued)

*Primary Examiner* — Benyam Ketema
(74) *Attorney, Agent, or Firm* — Morgan, Lewis & Bockius LLP

(57) ABSTRACT

Embodiments of the present disclosure relate to a touch display device, a touch circuit and a touch driving method thereof, and more particularly, a touch display device, a touch circuit and a touch driving method thereof enable to reduce effectively a ghost phenomenon in touch electrode groups by dividing a plurality of touch electrodes into a plurality of touch electrode groups with same patterns. The touch display device may include a display panel including a touch electrode group in which a plurality of long touch electrodes with long length and a plurality of short touch electrodes with short length in a first direction are alternately arranged in a second direction; and a touch circuit sequentially performing a self-capacitance sensing operation and a mutual-capacitance sensing operation for the touch electrode group.

16 Claims, 22 Drawing Sheets

(56) References Cited

U.S. PATENT DOCUMENTS

| | | | |
|---|---|---|---|
| 9,081,457 B2* | 7/2015 | Sol | G06F 3/0446 |
| 9,128,577 B2* | 9/2015 | Polishchuk | G09G 5/006 |
| 9,244,561 B2* | 1/2016 | Hotelling | G02F 1/134309 |
| 9,268,429 B2* | 2/2016 | Hotelling | G09G 3/3648 |
| 9,575,610 B2* | 2/2017 | Hotelling | G02F 1/134309 |
| 9,933,879 B2* | 4/2018 | Yao | G06F 3/041662 |
| 10,489,003 B1* | 11/2019 | Hsu | G06F 3/044 |
| 10,545,619 B2* | 1/2020 | Lee | G06F 3/04166 |
| 10,768,746 B1* | 9/2020 | Pant | G06F 3/044 |
| 11,093,093 B2* | 8/2021 | Weinerth | G06F 3/0446 |
| 11,204,658 B2* | 12/2021 | Miyake | G06F 3/04164 |
| 11,231,807 B1* | 1/2022 | Lu | G06F 3/044 |
| 11,256,365 B2* | 2/2022 | Lee | G06F 3/041662 |
| 11,269,456 B1* | 3/2022 | Eilers | G06F 3/0446 |
| 11,269,457 B1* | 3/2022 | Hollands | G06F 3/0445 |
| 2011/0084929 A1* | 4/2011 | Chang | G06F 3/04182 345/173 |
| 2011/0084937 A1* | 4/2011 | Chang | G01R 27/2605 345/174 |
| 2012/0062510 A1* | 3/2012 | Mo | G06F 3/0446 345/174 |
| 2013/0030740 A1* | 1/2013 | Bulea | G06F 3/0445 702/65 |
| 2013/0215075 A1* | 8/2013 | Lee | G06F 3/0412 345/174 |
| 2013/0271160 A1* | 10/2013 | Sol | G06F 3/041 324/661 |
| 2014/0021966 A1* | 1/2014 | Shahrokhi | G01R 27/2605 324/679 |
| 2015/0109235 A1* | 4/2015 | Chae | G06F 3/04166 345/174 |
| 2015/0145802 A1* | 5/2015 | Yao | G06F 3/0446 345/174 |
| 2015/0160756 A1* | 6/2015 | Polishchuk | G06F 3/044 345/174 |
| 2015/0317012 A1* | 11/2015 | Solven | G06F 3/0443 345/174 |
| 2015/0355746 A1* | 12/2015 | Hoch | G01R 27/2605 345/174 |
| 2015/0378498 A1* | 12/2015 | Huie | G06F 1/169 345/174 |
| 2016/0117023 A1* | 4/2016 | Hotelling | G02F 1/133528 349/12 |
| 2016/0162084 A1* | 6/2016 | Wang | G06F 3/0446 345/173 |
| 2016/0195986 A1* | 7/2016 | Kwon | G06F 3/0488 345/174 |
| 2017/0090622 A1* | 3/2017 | Badaye | G06F 3/0448 |
| 2017/0147123 A1* | 5/2017 | Wang | G06F 3/04164 |
| 2019/0114019 A1* | 4/2019 | Maguire | G06F 3/0445 |
| 2019/0294310 A1* | 9/2019 | Lee | G06F 3/04184 |
| 2021/0141478 A1* | 5/2021 | Oh | G02F 1/13338 |
| 2021/0397304 A1* | 12/2021 | Li | G06F 3/0446 |
| 2022/0027012 A1* | 1/2022 | Kim | G06F 3/0443 |
| 2022/0066594 A1* | 3/2022 | Shim | H01L 27/323 |

* cited by examiner

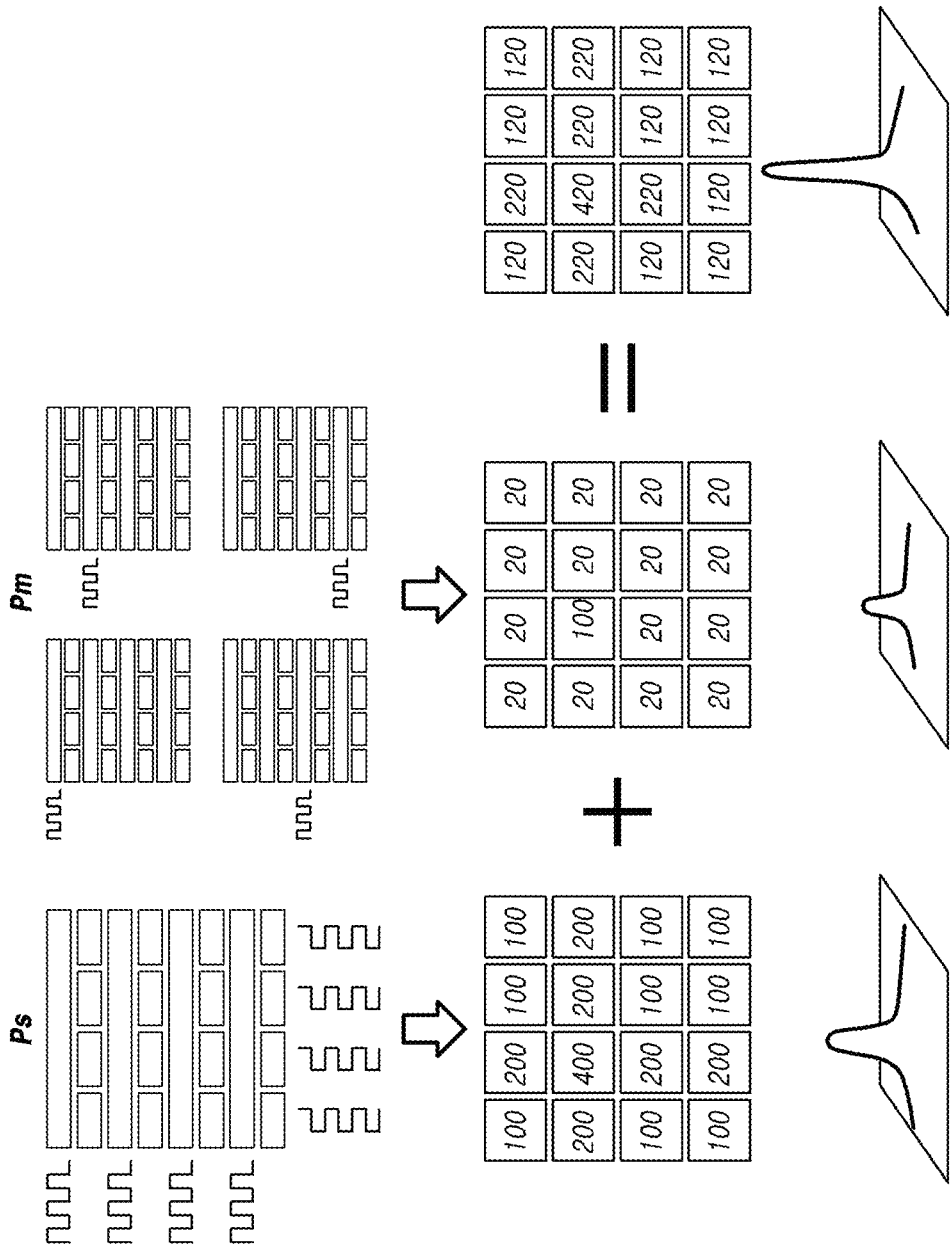

TOUCH DISPLAY DEVICE, TOUCH CIRCUIT AND TOUCH DRIVING METHOD THEREOF

CROSS REFERENCE TO RELATED APPLICATION

This application claims priority from Korean Patent Applications No. 10-2020-0091717, filed on Jul. 23, 2020 and No. 10-2020-0096029, filed on Jul. 31, 2020, which are hereby incorporated by reference for all purposes as if fully set forth herein.

BACKGROUND

Technical Field

Embodiments relate to a touch display device, a touch circuit and a touch driving method thereof.

Discussion of the Related Art

With the development of multimedia, the importance of flat panel display devices is increasing. In response to this, flat panel display devices such as a Liquid Crystal Display (LCD), a Plasma Display Panel (PDP), and an Organic Light Emitting Display (OLED) are commercially available.

Among the flat panel display devices, the liquid crystal display is widely used as a mobile display device, especially such as a notebook, computer monitor, or television because it has advantages like excellent image quality, low weight, narrow thickness, and low power consumption.

On the other hand, a touch display device, in which a touch panel is stacked on such a display device, that generates information corresponding to a touch point from a sense of the touch point or performs a calculation about a touch operation is widely used by using a feature that electrical characteristics such as resistance or capacitance change at the touch point where a hand or a stylus pen comes into contact. Such a touch display device is one of user interfaces, and its application is expanding to small portable terminals, office devices, mobile devices, and the like.

However, when the touch panel is separately stacked on the display device, the touch display device becomes thicker. Thus, there is a limitation in manufacturing it thin, a light transmission efficiency decreases by passing through the laminated touch panel, and a manufacturing cost increases. In order to solve such problems, recently, an advanced in-cell touch (AIT) type display device in which touch electrodes are embedded in pixel area of the display panel has been proposed.

In order to provide a touch sensing function, such a touch display device must be able to identify the presence or not of a user's touch and accurately sense touch coordinates. For the purpose of above, the touch display device includes a touch panel having a touch sensor structure.

The touch panel has a touch sensor structure including a plurality of touch electrodes and a plurality of touch routing lines for connecting them to a touch sensing circuit. Meanwhile, the touch panel may include a plurality of touch channels or a plurality of touch pads electrically connected to the touch sensing circuit.

Since the touch panel has a touch sensor structure which requires complex or several layers, it may arise problems that a manufacturing process of the touch panel is complicated, the manufacturing yield of the touch panel is poor, or the manufacturing cost is increased.

In addition, when the size of the touch panel increases, a number of touch electrodes, and a number of touch routing lines and touch pads increases. Accordingly, a complexity of a manufacturing process and a manufacturing cost of the touch panel may increase, and a complexity and a manufacturing cost of circuit components may increase.

In addition, in the case of a multi-touch in which two or more fingers are simultaneously touched, or a finger and a stylus pen are simultaneously touched on the touch panel, a ghost phenomenon in which a non-touched point is mistaken as a touch point may occur according to the structure of the touch electrodes.

SUMMARY

Accordingly, embodiments of the present disclosure are directed to a touch display device, a touch circuit and touch driving method thereof that substantially obviate one or more of the problems due to limitations and disadvantages of the related art.

An aspect of the present disclosure is to provide a touch display device, a touch circuit and touch driving method thereof that can reduce effectively a ghost phenomenon from a multi-touch.

An aspect of the present disclosure is to provide a touch display device, a touch circuit and touch driving method thereof that can reduce effectively a ghost phenomenon in touch electrode groups by dividing a plurality of touch electrodes into a plurality of touch electrode groups with same patterns.

An aspect of the present disclosure is to provide a touch display device, a touch circuit and touch driving method thereof that can reduce effectively a ghost phenomenon by performing a self-capacitance sensing operation and a mutual-capacitance sensing operation together for the touch electrodes in the touch electrode groups.

An aspect of the present disclosure is to provide a touch display device, a touch circuit and touch driving method thereof that can reduce effectively a ghost phenomenon occurred within the touch electrode groups for woven type touch electrode structure.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a touch display device comprises: a display panel including a touch electrode group in which a plurality of long touch electrodes with long length and a plurality of short touch electrodes with short length in a first direction are alternately arranged in a second direction; and a touch circuit sequentially performing a self-capacitance sensing operation and a mutual-capacitance sensing operation for the touch electrode group.

According to an aspect, the plurality of short touch electrodes forms a plurality of short touch electrode blocks in which a certain number of short touch electrodes disposed in the second direction are connected by a same touch line.

According to an aspect, the touch electrode group includes: N (N is an integer of 2 or more) long touch electrodes extending in the first direction and parallel in the second direction; and M (M is integer of 2 or more) short touch electrode blocks in which a certain number of short touch electrodes are connected with each other in the second direction.

According to an aspect, each of the touch electrode group is electrically separated in an active area in which image is displayed in the display panel, and connected to the touch circuit through the touch line in a non-active area in which image is not displayed in the display panel.

According to an aspect, the touch electrode group is formed as a size corresponding to a reference distance capable of detecting a multi-touch.

According to an aspect, the touch circuit includes: a first touch sensing circuit supplying a long touch driving signal to the long touch electrode and receiving a touch sensing signal from the long touch electrode through long touch lines, a second touch sensing circuit supplying a short touch driving signal to the short touch electrode or receiving the touch sensing signal from the short touch electrode through short touch lines, and a touch controller detecting a touch presence or not or a touch position based on the touch sensing signal transmitted from the first touch sensing circuit and the second touch sensing circuit.

According to an aspect, the first touch sensing circuit includes: a first switch circuit connected to the long touch electrode for switching a transmission path of the long touch driving signal and the touch sensing signal; and a first touch signal control circuit for supplying the long touch driving signal to the first switch circuit or receiving the touch sensing signal from the first switch circuit.

According to an aspect, the second touch sensing circuit includes: a second switch circuit connected to the short touch electrode for switching a transmission path of the short touch driving signal and the touch sensing signal; and a second touch signal control circuit for supplying the short touch driving signal to the second switch circuit or receiving the touch sensing signal from the second switch circuit.

According to an aspect, the second switch circuit includes: a first switch receiving the short touch driving signal; and a third switch electrically connected to the second touch signal control circuit; wherein the second touch signal control circuit includes an operational amplifier in which a common voltage is supplied to a non-inverting input terminal and an inverting input terminal is connected to the third switch.

According to an aspect, the second touch signal control circuit includes an operational amplifier in which a non-inverting input terminal is connected simultaneously to a first switch receiving the short touch driving signal and a second switch receiving a common voltage, and an inverting input terminal is connected to the second switch circuit.

According to an aspect, the self-capacitance sensing operation is performed by suppling respectively the long touch driving signal and the short touch driving signal to the long touch electrode and the short touch electrode, and then receiving the touch sensing signal; and the mutual-capacitance sensing operation is performed by supplying the long touch driving signal to at least one of long touch electrode selected from the touch electrode group, and receiving the touch sensing signal from a plurality of short touch electrodes selected from the touch electrode group.

According to an aspect, the at least one long touch electrode selected from the touch electrode group is a long touch electrode close to adjacent touch electrode group in the second direction.

According to an aspect, the plurality of short touch electrodes selected from the touch electrode group are a plurality of short touch electrodes located at outer area of the touch electrode group.

According to an aspect, the touch circuit receives the long touch driving signal and the short touch driving signal from a touch power integrated circuit.

According to an aspect, the touch circuit generates the long touch driving signal and the short touch driving signal using a touch driving signal received from a touch power integrated circuit.

According to an aspect, the display panel is divided into a plurality of touch electrode group blocks each including at least one of touch electrode group and the divided touch electrode group block is connected to a multiplexer, and the touch electrode group block is performed sequentially the self-capacitance sensing operation and the mutual-capacitance sensing operation according to a control of the multiplexer.

According to an aspect, the display panel is divided into a plurality of touch electrode group blocks each including at least one of touch electrode group and the divided touch electrode group block is connected to a multiplexer, and the self-capacitance sensing operation and the mutual-capacitance sensing operation is performed sequentially by supplying long touch driving signals to the plurality of touch electrode group blocks according to a control of the multiplexer.

According to an aspect, when the long touch driving signal is simultaneously supplied to the plurality of touch electrode group blocks, the touch sensing signals are received from the short touch electrodes located at different positions in the second direction for each of the touch electrode group blocks.

According to an aspect, the mutual-capacitance sensing operation is performed when a multi-touch or touch ghost is detected.

According to an aspect, the touch circuit detects touch presence or not or touch coordinates by adding a result of the self-capacitance sensing operation and a result of the mutual-capacitance sensing operation.

In another aspect, a touch circuit for detecting a touch of a display panel including a touch electrode group in which a plurality of long touch electrodes with long length and a plurality of short touch electrodes with short length in a first direction are alternately arranged in a second direction comprises: a first touch sensing circuit supplying a long touch driving signal to the long touch electrode and receiving a touch sensing signal from the long touch electrode through long touch lines, a second touch sensing circuit supplying a short touch driving signal to the short touch electrode or receiving the touch sensing signal from the short touch electrode through short touch lines, and a touch controller sequentially performing a self-capacitance sensing operation and a mutual-capacitance sensing operation for the touch electrode group, and detecting a touch presence or not and a touch position based on the touch sensing signal transmitted from the first touch sensing circuit and the second touch sensing circuit.

In another aspect, a touch driving method for detecting a touch of a display panel including a touch electrode group in which a plurality of long touch electrodes with long length and a plurality of short touch electrodes with short length in a first direction are alternately arranged in a second direction comprises: performing a self-capacitance sensing operation for the touch electrode group; and performing a mutual-capacitance sensing operation for the touch electrode group after the self-capacitance sensing operation.

In according to exemplary embodiments, it may provide a touch display device, a touch circuit and touch driving method thereof enable to reduce effectively a ghost phenomenon from a multi-touch.

In according to exemplary embodiments, it may provide a touch display device, a touch circuit and touch driving method thereof enable to reduce effectively a ghost phenomenon in touch electrode groups by dividing a plurality of touch electrodes into a plurality of touch electrode groups with same patterns.

In according to exemplary embodiments, it may provide a touch display device, a touch circuit and touch driving method thereof enable to reduce effectively a ghost phenomenon by performing a self-capacitance sensing operation and a mutual-capacitance sensing operation together for the touch electrodes in the touch electrode groups.

In according to exemplary embodiments, it may provide a touch display device, a touch circuit and touch driving method thereof enable to reduce effectively a ghost phenomenon occurred within the touch electrode groups for woven type touch electrode structure.

It is to be understood that both the foregoing general description and the following detailed description are exemplary and explanatory and are intended to provide further explanation of the inventive concepts as claimed.

DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings:

FIG. 22 illustrates a conceptual diagram of detecting a touch by combining a self-capacitance sensing signal and a mutual-capacitance sensing signal in a touch display device according to embodiments.

DETAILED DESCRIPTION

Figure 1:
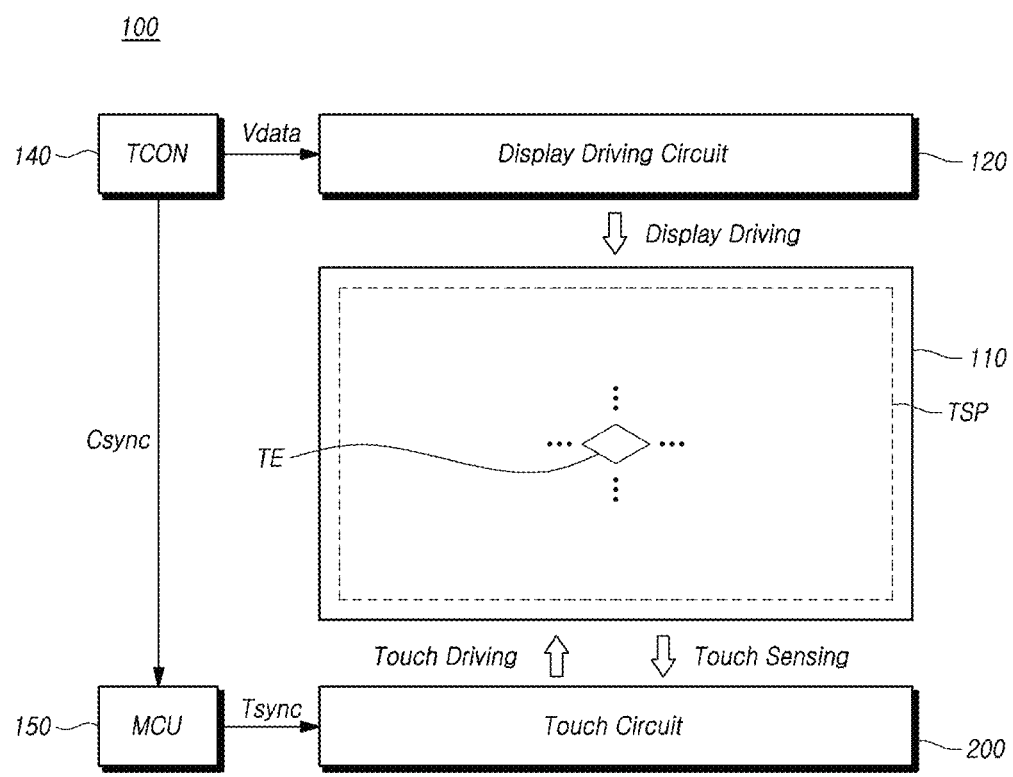
FIG. 1 illustrates a block diagram of a touch display device according to embodiments.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing" and "constituting" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

FIG. 1 illustrates a block diagram of a touch display device according to embodiments.

Referring to FIG. 1, the touch display device 100 according to embodiments may have a function of displaying images and a function of sensing a touch from a user.

In order to implement both a function of displaying the images and a function of sensing a touch, the touch display device 100 may include a display panel 110 in which a plurality of data lines and a plurality of gate lines are arranged, a display driving circuit 120 for driving the display panel 110, and the like.

In terms of functionality, the display driving circuit 120 may include a data driving circuit for driving the data lines, a gate driving circuit for driving the gate lines, and a controller for controlling the data driving circuit and the gate driving circuit. The display driving circuit 120 may be implemented as one or more integrated circuits.

The touch display device 100 may include a touch screen panel TSP in which a plurality of touch electrodes TE for sensing touches are arranged, and a touch circuit 200 for driving the touch screen panel TSP and processing signals related to touches.

The touch screen panel TSP in the touch display device 100 may be an external type in which the touch screen panel TSP is manufactured separately from the display panel 110 and thereafter bonded with the display panel 110, or an embedded type in which the touch screen panel TSP is manufactured together with the display panel 110 and located inside of the display panel 110.

Thus, the touch screen panel TSP in the touch display device 100 according to embodiments may be an independent panel having a function of sensing a touch, or a display panel 110 having a function of displaying together with the function of sensing a touch. Hereinafter, for convenience of description, it is assumed that the display panel 110 includes the touch screen panel TSP.

The touch circuit 200 may provide a touch driving signal to the display panel 110 for driving the display panel 110, receive a touch sensing signal from the display panel 110, and detect a touch presence or not or a touch coordinate based on the touch sensing signal.

The touch circuit 200 may include a touch sensing circuit for providing the touch driving signal and receiving the touch sensing signal, and a touch controller for detecting the touch presence or not or calculating the touch coordinate.

The touch circuit 200 may be implemented as one or more components like integrated circuits, or implemented separately from the display driving circuit 120.

Further, all or at least a part of the touch circuit 200 may be implemented by being integrated with the display driving circuit 120 or an inner circuit of the display driving circuit 120. For example, the touch sensing circuit of the touch circuit 200 may be implemented as an integrated circuit with the data driving circuit of the display driving circuit 120.

In addition, the touch display device 100 may include a micro control unit (MCU) 150 that controls the touch circuit 200.

The micro control unit 150 may generate a touch synchronization signal Tsync that controls the touch circuit 200 based on a control synchronization signal Csync received from the timing controller (TCON) 140. The micro control unit 150 supplies and receives touch signals with the touch circuit 200 based on a defined interface.

Here, the micro control unit 150 may be formed in an integrated circuit together with the touch controller in the touch circuit 200, or may be formed in an integrated circuit together with the timing controller 140.

In addition, the touch display device 100 may include the timing controller 140 that controls the display driving circuit 120 and the micro control unit 150.

The timing controller 140 receives timing signals such as a vertical synchronization signal, a horizontal synchronization signal, a data enable signal, and a main clock, and an image data signal Vdata from a host system (not shown).

The timing controller 140 controls the scan timing of the display driving circuit 120 based on scan timing control signals including a gate start pulse, a gate shift clock, and a gate output enable signal. In addition, the timing controller 140 controls the data timing of the display driving circuit 120 based on data timing control signals including a source sampling clock and a source output enable signal.

Meanwhile, the touch display device 100 may sense the touch presence or not or the touch coordinate based on capacitance formed by touch electrodes TE.

The touch display device 100 may sense a touch by a mutual-capacitance scheme or a self-capacitance scheme, as a capacitance based touch sensing scheme.

In case of a touch sensing scheme based on mutual-capacitance, a plurality of touch electrodes TE may be classified as touch driving electrodes which is supplied touch driving signals through touch driving lines, and touch sensing electrodes which forms capacitances with the touch driving electrodes and supplies touch sensing signals through touch sensing lines. Here, the touch driving lines and the touch sensing lines may be referred to as touch lines.

In case of the touch sensing scheme based on mutual-capacitance, the touch presence or not and the touch coordinate may be detected based on a change of mutual-capacitance formed between the touch driving electrode and the touch sensing electrode according to a presence or absence of a pointer such as a finger, a pen, or the like.

In case of the touch sensing scheme based on self-capacitance, each touch electrode serves as both the touch driving electrode and the touch sensing electrode. That is, a touch driving signal is supplied to a touch electrode TE through a touch line, and a touch sensing signal generated in the touch electrode, to which the touch driving signal is supplied, is transmitted through the same touch line. Accordingly, in case of the touch sensing scheme based on self-capacitance, there is no distinction between the touch driving electrode and the touch sensing electrode and no distinction between the touch driving line and the touch sensing line.

In case of the touch sensing scheme based on self-capacitance, the touch presence or not and a touch coordinate may be detected based on a change in capacitance formed between a pointer such as a finger, a pen, or the like, and a touch electrode TE.

Thus, the touch display device 100 may sense a touch by the touch sensing scheme based on mutual-capacitance or the touch sensing scheme based on self-capacitance.

Further, such a touch display device 100 may be various types of display devices, such as a liquid crystal display device, an organic light emitting display device, a plasma display panel, a quantum dot display device, and the like.

For example, when the touch display device 100 according to embodiments is a liquid crystal display device, a plurality of touch electrodes TE may be arranged on the display panel 110, and may be common electrodes to which a common voltage for displaying images is applied.

Figure 2:
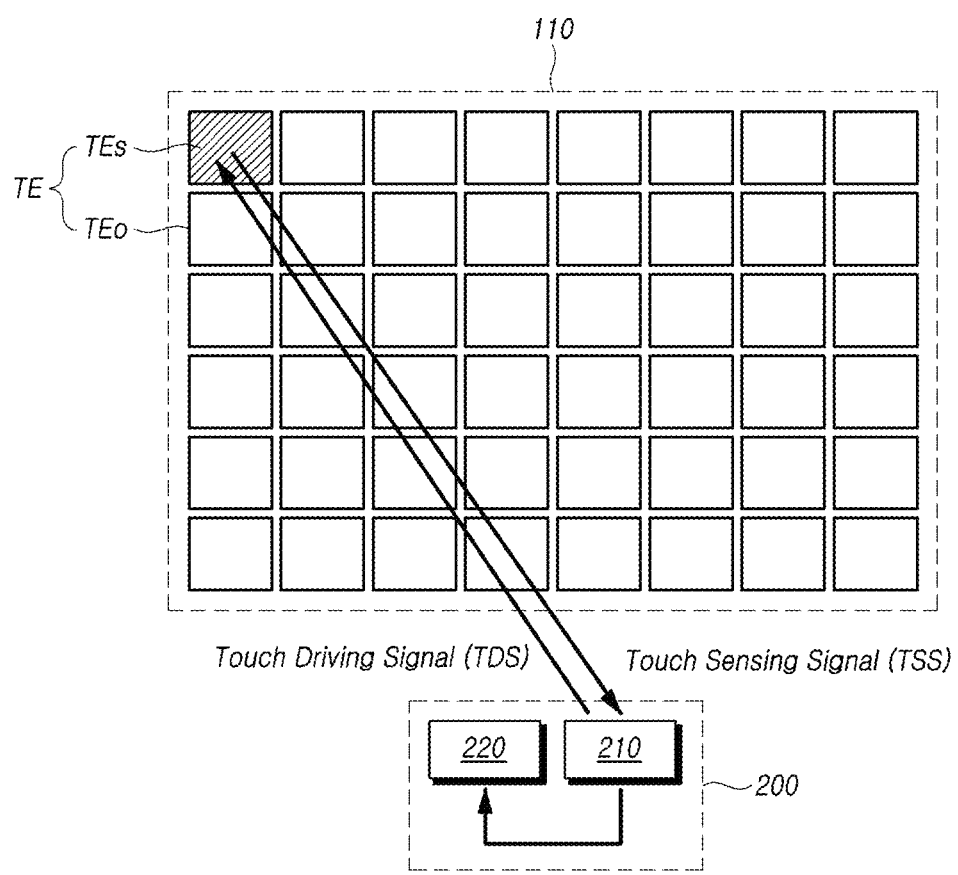
FIG. 2 illustrates an example of touch driving and sensing operations in the touch display device according to embodiments.

FIG. 2 illustrates an example of touch driving and sensing operations in the touch display device according to embodiments.

Referring to FIG. 2, the touch display device 100 according to embodiments includes a plurality of touch electrodes TE serving as a touch sensor to provide a touch sensing function, a touch circuit 200 detecting a touch by sequentially driving the touch electrodes TE, and the like.

The touch circuit 200 may detect the touch presence or not and a touch coordinate by sequentially driving and sensing a plurality of touch electrodes TE in a touch sensing period in which touch sensing is performed.

More specifically, the touch circuit 200 may select at least one touch electrode among a plurality of touch electrodes TE as a touch electrode TEs to be sensed, and provide a touch driving signal TDS to the selected touch electrode TEs. Thereafter, the touch circuit 200 may detect the touch presence or not or a touch coordinate by determining a change in capacitance (or a change in voltage, a change in an amount of charge, or the like) for each touch electrode TE based on touch sensing signals TSS received from the selected touch electrode TEs and non-selected touch electrode TEo.

The touch circuit 200 may include, for example, a touch controller 220 controlling a generation of signals related to touch detection, and performing a process for detecting a touch presence and calculating a touch coordinate, and a touch sensing circuit 210 providing the touch driving signal TDS to the display panel 110, detecting the touch sensing signal TSS from the touch electrode TEs to which the touch driving signal TDS is provided, and providing the detected the touch sensing signal TSS to the touch controller 220.

Here, the touch sensing period for detecting a touch may be separated in time from a display driving period in which images are displayed on the display panel 110, or be concurrently performed with the display driving period.

Further, a load-free driving process for reducing parasitic capacitance formed through at least one touch electrode TE may be performed by providing an alternating current signal with the same phase and amplitude as the touch driving signal TDS to at least one data line and at least one gate line of the display panel 110 in the touch sensing period. In this case, the touch driving signal TDS may correspond to a load-free driving signal.

In this case, a size of the touch electrode TE disposed on the display panel 110 may correspond to a size of one subpixel or a size of two or more subpixels. In addition, each touch electrode TE may be a plate type without openings or a mesh type with one or more openings.

If one touch electrode TE is a mesh type and has a size corresponding to a size of two or more subpixels, one touch electrode TE has two or more openings, and a position and a size of each of the two or more openings may correspond to a position and a size of the light emitting area of the subpixel.

In this case, the display panel 110 is may be a split type in which each of the plurality of touch electrodes TE with same size is separated from each other, or a woven type in which touch electrodes TE with different sizes are arranged in adjacent rows or columns.

Figure 3:
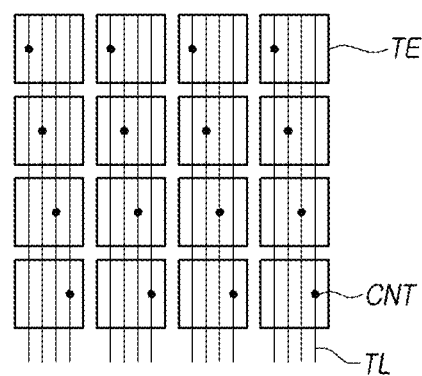
FIG. 3 illustrates a display panel comprised of split type touch electrodes in a touch display device according to embodiments.
Figure 4:
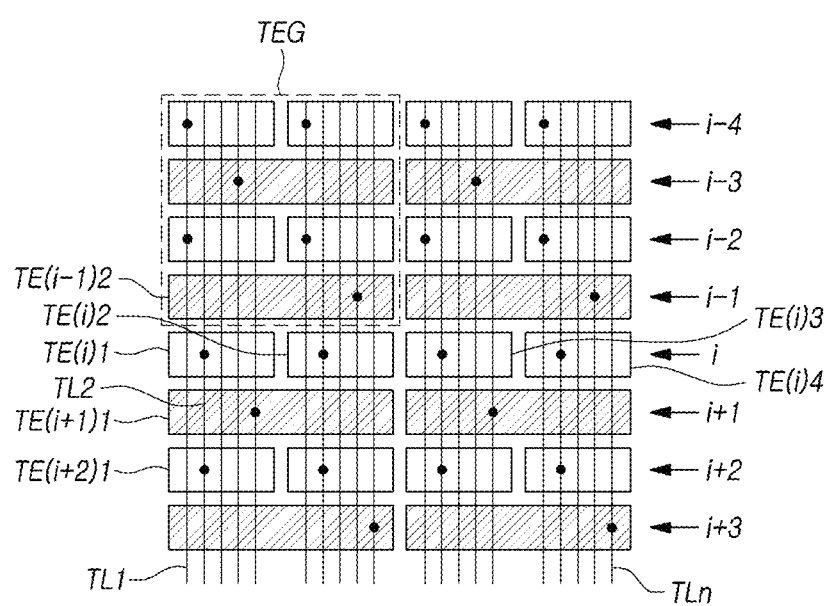
FIG. 4 illustrates a display panel comprised of woven type touch electrodes in a touch display device according to embodiments.

FIG. 3 illustrates a display panel comprised of split type touch electrodes in a touch display device according to embodiments, and FIG. 4 illustrates a display panel comprised of woven type touch electrodes in a touch display device according to embodiments.

Referring to FIG. 3, when a plurality of split type touch electrodes TE are disposed in the display panel 110 of the touch display device 100 according to embodiments, each of a plurality of touch electrodes TE may be electrically connected with touch lines TL through one or more contact holes CNT.

The plurality of touch electrodes TE may be positioned in an active area. Depending on cases, some (e.g., outermost touch electrodes) of the plurality of touch electrodes TE may be positioned in an outside area (bezel area) of the active area or may extend to the outside area (bezel area) of the active area. The active area may be an area in which images are displayed or touch sensing process is performed.

A plurality of touch lines TL electrically connected to the plurality of touch electrodes TE may be positioned in an active area. Depending on cases, all or some of the plurality of touch lines TL may be positioned at outside area of the active area. When the plurality of touch lines TL electrically connected to the plurality of touch electrodes TE are positioned in the active area, the plurality of touch lines TL may be overlapped the plurality of touch electrodes TE by positioning in a layer different from the plurality of touch electrodes TE.

The plurality of touch lines TL all may have the same or similar length and may be disposed from a point connected with the touch sensing circuit 210 to the opposite point. The plurality of touch lines TL may be different only in the position (i.e., the position of the contact hole CNT) where they are respectively connected with the corresponding touch electrodes TE.

In a case of a split type display panel 110, if one touch electrode TE is electrically connected with one touch line TL, there should be a plurality of touch lines TL as many as the number of a plurality of touch electrodes TE. The number of the plurality of touch lines TL may correspond to the number of touch channels for signal input and output of the touch sensing circuit 210.

Accordingly, in case of a split type display panel 110 composed of 4×4 touch electrodes TE in which sixteen touch electrodes TE are arranged in four rows and four columns, sixteen touch lines TL and sixteen touch channels may exist.

Referring to FIG. 4, the display panel 110 on which the woven type touch electrodes TE are disposed, in the touch display device 100 according to embodiments, has a plurality of touch lines TL that are electrically connected to the plurality of touch electrodes TE through a plurality of contact holes CNT, but sizes of the touch electrodes TE disposed in adjacent rows may be different from each other.

For example, sizes of the touch electrodes TE(i)1, TE(i)2, TE(i)3, TE(i)4 arranged in the ith row (i) may be different from sizes of the touch electrode TE(i−1)2 arranged in the (i−1)th row (i−1) and sizes of the touch electrode TE(i+1)1 arranged in the (i+1)th row (i+1). Accordingly, in the display panel 110 on which the woven type touch electrodes TE are disposed, a number of touch electrodes TE disposed in a plurality of rows i−4, i−3, i−2, i−1, i, i+1, i+2, i+3, may not be same, and any one row (e.g., ith row) of two adjacent rows (e.g., (i+1)th row and ith row) may have a number of touch electrodes TE more than the other row (e.g., (i+1)th row).

At this time, the touch electrodes (e.g., TE(i−1)2 and TE(i+1)1) that are formed long in the row direction may be referred to as long touch electrodes, and the remaining touch electrodes (e.g., TE(i)1, TE(i)2, TE(i)3, TE(i)4, and TE(i+2)1) may be referred to as short touch electrodes.

The display panel 110 may have a matrix structure that a long touch electrode having a long length in a row direction and a short touch electrode having a short length in a row direction are arranged alternately in a column direction.

On the other hand, a certain number of the short touch electrodes having sizes smaller than that of the long touch electrodes may be connected by one touch line TL to correspond to the length of a long touch electrode. For example, a first touch electrode TE(i)1 in the ith row and a first touch electrode TE(i+2)1 in the (i+2)th row may be electrically connected to each other by one touch line TL2.

In this case, two or more touch electrodes (TE (i)1 and TE(i+2)1) connected by one touch line TL2 are disposed apart from each other by the long touch electrode TE(i+1)1 located in the (i+1)th row, but they may operate as one touch electrode TE because they have same potential states in touch driving process. Therefore, even though two or more short touch electrodes connected by one touch line TL are disposed apart from by other touch electrodes and are arranged in different rows, they are formed as a short touch electrode block electrically connected by the same touch line TL and may act like one short touch electrode. In this case, a plurality of short touch electrodes connected by same touch line may be referred to as a short touch electrode or may be referred to as a short touch electrode block.

In this way, a short touch electrode block may be formed by connecting a plurality of short touch electrodes to the same touch line TL in a specific number unit. The number of short touch electrodes connected with a same line by one touch line TL may vary depending on the size of the long touch electrodes.

On the other hand, this illustrates a structure in which long touch electrodes having a long length in the row direction are arranged at positions that are not lined up with each other with respect to the long touch electrodes adjacent in the column direction, but the long touch electrodes may be arranged at the positions lined up with each other in the column direction.

As described above, in the case of a woven type touch electrode structure in which a long touch electrode with a long length and a short touch electrode with a short length in a row direction are alternately arranged in a column direction, a touch electrode group TEG may include N (N is an integer of 2 or more) number of long touch electrodes with a long length and M (M is an integer of 2 or more) number of short touch electrode blocks which are arranged in parallel and correspond to the long touch electrodes.

For example, when the length of the long touch electrode corresponds to the length of two short touch electrodes, two short touch electrodes arranged in the column direction may constitute a short touch electrode block connected by one same line. Therefore, a touch electrode group TEG may be comprised of two long touch electrodes and two short touch electrode blocks each connected by the same line.

Here, a touch electrode group TEG may correspond to an area in which the two long touch electrodes and two short touch electrode blocks each connected by the same line are arranged in a size of 2×2.

As described above, in the case of a woven type touch electrode structure having different sizes of the touch electrodes TE arranged in adjacent rows, the area of the touch electrode group TEG may be variously changed according to the number of short touch electrodes connected together by one touch line TL and the length of the long touch electrodes.

Figure 5:
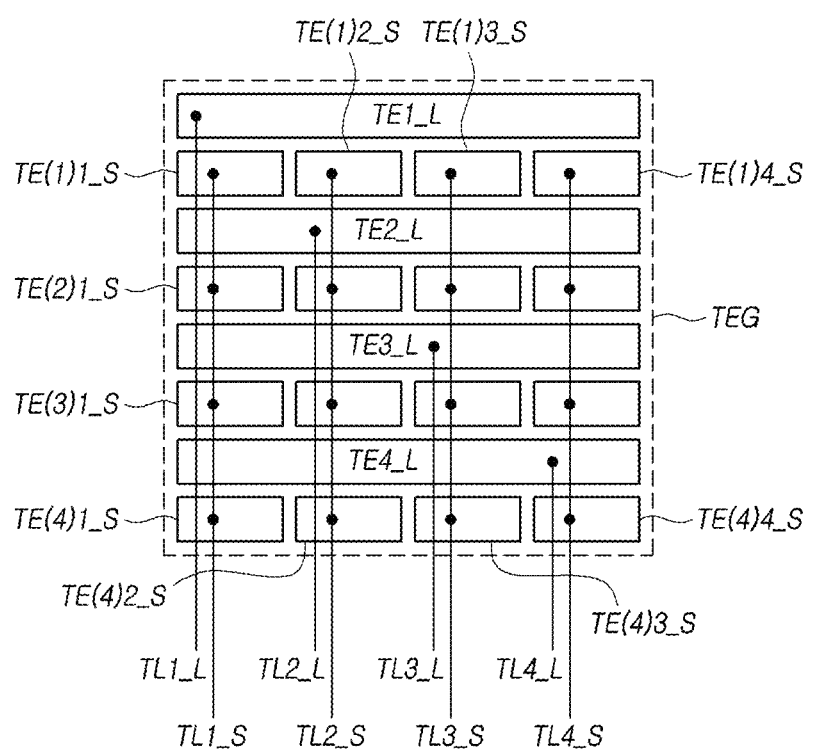
FIG. 5 illustrates a woven type display panel with a touch electrode group comprised of 4×4 touch electrodes according to embodiments.

FIG. 5 illustrates a woven type display panel with a touch electrode group comprised of 4×4 touch electrodes according to embodiments.

Referring to FIG. 5, the woven type display panel 110 of the touch display device 100 according to embodiments may include a plurality of touch electrode groups TEG comprising of four long touch electrodes and four short touch electrode blocks connected by the same line.

In other words, each long touch electrodes TE1_L, TE2_L, TE3_L, TE4_L with long lengths in the row direction may correspond to a length of four short touch electrodes TE(1)1_S, TE(1)2_S, TE(1)3_S, TE(1)4_S, and in this case, the four short touch electrodes (e.g., TE(1)1_S, TE(2)1_S, TE(3)1_S, TE(4)1_S) in a column direction may be connected to one short touch line (e.g., TL1_S). Therefore, four short touch electrodes arranged in the column direction may constitute one short touch electrode block connected by a same line. Also, four long touch electrodes and four short touch electrode blocks connected by the same line corresponding to them may constitute one touch electrode group TEG.

In the case of the woven type 4×4 touch electrode structure, a number of the short touch electrodes in a row where the short touch electrodes are arranged among two adjacent rows is four times of the number of long touch electrodes in a row where the long touch electrodes are arranged. Accordingly, each length of the long touch electrodes TE1_L, TE2_L, TE3_L, TE4_L is approximately four times the length of each of the short touch electrodes.

In this case, the woven type 4×4 touch electrode structure consists of four long touch electrodes TE1_L, TE2_L, TE3_L, TE4_L and sixteen short touch electrodes TE(1)1_S, TE(1)2_S, TE(1)3_S, TE(1)4_S-TE(4)1_S, TE(4)2_S, TE(4)3_S, TE(4)4_S, but four short touch electrodes (e.g., TE(1)1_S, TE (2) 1_S, TE (3) 1_S, TE (4) 1_S) in a column direction are connected to one short touch line (e.g., TL1_S). Therefore, four short touch electrodes (e.g., TE(1)1_S, TE(2)1_S, TE(3)1_S, TE(4)1_S) connected to the short touch line (e.g., TL1_S) constitutes one short touch electrode block connected by same line, and sixteen short touch electrodes TE(1)1_S, TE(1)2_S, TE(1)3_S, TE(1)4_S-TE(4)1_S, TE(4)2_S, TE(4)3_S, TE(4)4_S constitute four short touch electrode blocks connected respectively by the same line.

As a result, each long touch line TL1_L, TL2_L, TL3_L, TL4L is connected to four long touch electrodes TE1_L, TE2_L, TE3_L, TE4_L respectively, and each of four short touch electrode blocks connected by same line is connected to the short touch lines TL1_S, TL2_S, TL3_S, TL4_S respectively. Therefore, in the case of a woven type 4×4 touch electrode structure, eight touch lines TL1_L, TL2_L, TL3_L, TL4L, TL1_S, TL2_S, TL3_S, TL4_S and eight touch channels are required.

Accordingly, comparing to the split type touch electrode structure, the woven type touch electrode structure has an effect of reducing the number of touch lines and touch channels.

On the other hand, the size of the touch electrode group TEG may be variously changed, but the size of the touch electrode group TEG may be determined in consideration of a distance between a finger or a stylus for detecting for multi-touch in order to efficiently arrange the touch electrodes TE on the display panel 110 and increase the accuracy of detection for multi-touch.

On the other hand, a plurality of a woven type touch electrode groups TEG may be disposed in a horizontal direction and a vertical direction in the display panel 110. In this case, each touch electrode group TEG is electrically separated in an active area in which an image is displayed in the display panel 110, but it may be connected to the touch circuit 200 through a touch line TL in a non-active area in which an image is not displayed in the display panel 110.

Figure 6:
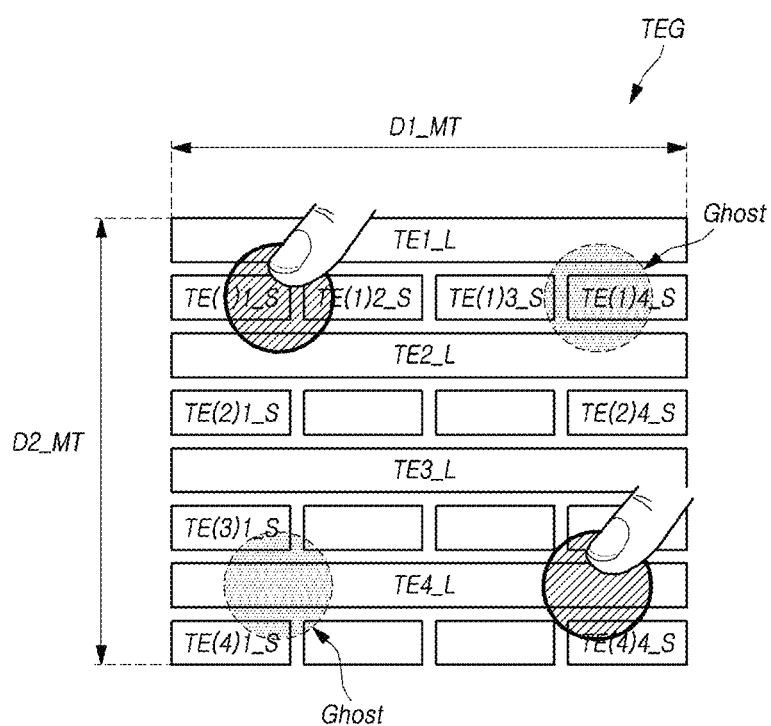
FIG. 6 illustrates a ghost phenomenon due to a multi-touch in display panel with a woven type touch electrode structure comprised of 4×4 touch electrodes.

FIG. 6 illustrates a ghost phenomenon due to a multi-touch in display panel with a woven type touch electrode structure comprised of 4×4 touch electrodes.

Referring to FIG. 6, in the case of the display panel 110 having a 4×4 woven type touch electrode structure according to embodiments, a length of long touch electrodes TE1_L, TE2_L, TE3_L, TE4_L correspond to a length of four short touch electrodes (e.g., TE(1)1_S, TE(1)2_S, TE(1)3_S, TE(1)4_S) in a row direction. Thus, a capacitance induced in the long touch electrode TE1_L, TE2_L, TE3_L, TE4_L by a finger or stylus may affect adjacent four short touch electrodes (e.g., TE(1)1_S, TE(1)2_S, TE(1)3_S, TE(1)4_S).

In other word, when a touch such as a finger or a stylus is made on a touch electrode group TEG in the display panel 110 having a 4×4 woven type touch electrode structure, capacitance is generated simultaneously in a long touch electrode (e.g., TE1_L, TE4_L) and a plurality of short touch electrodes (e.g., TE(1)1_S, TE(1)2_S, TE(1)3_S, TE(1)4_S, TE(4)1_S, TE(4)2_S, TE(4)3_S, TE(4)4_S) adjacent to the long touch electrode. As a result, a ghost phenomenon may occur in a corner area where a touch is not made on the touch electrode group TEG.

On the other hand, a size of the touch electrode group TEG may be determined according to a reference distance (horizontal length D1_MT, vertical length D2_MT, or diagonal length) to the extent that multi-touch detection is possible, that is, the touch electrode group TEG may be formed as a size corresponding to the reference distance capable of detecting a multi-touch.

Accordingly, in the 4×4 woven type touch electrode structure, the ghost phenomenon may occur often when a multi-touch is generated by the finger or the stylus at the edge or corner area of the touch electrode group TEG.

Accordingly, the touch display device 100 according to the embodiments may effectively reduce the ghost phenomenon by performing self-capacitance sensing operation and mutual capacitance sensing operation together at a corner area where ghost phenomenon occurs at the corner area of the display panel 110 having a woven type touch electrode structure.

Figure 7:
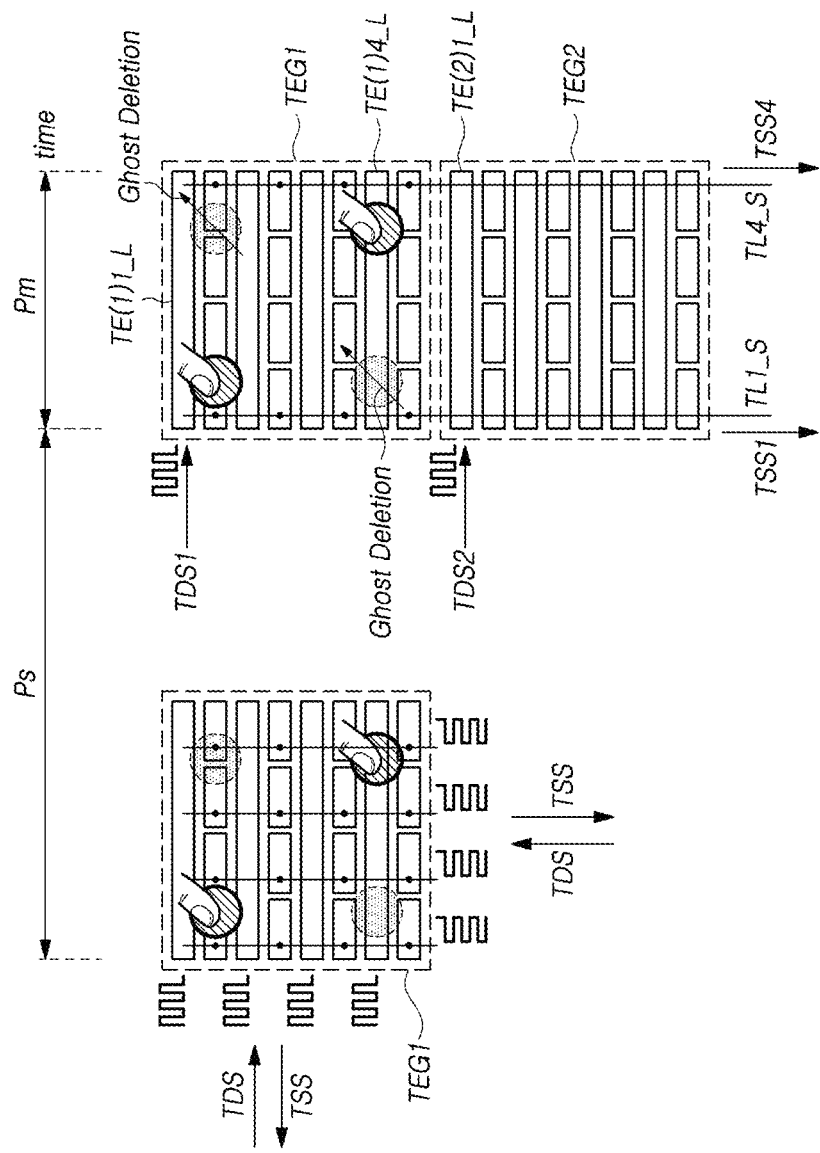
FIG. 7 illustrates a conceptual diagram of a method of performing a self-capacitance sensing operation and a mutual-capacitance sensing operation together in a corner region of a display panel with a woven type touch electrode structure in a touch display device according to embodiments.

FIG. 7 illustrates a conceptual diagram of a method of performing a self-capacitance sensing operation and a mutual-capacitance sensing operation together in a corner region of a display panel with a woven type touch electrode structure in a touch display device according to embodiments.

Referring to FIG. 7, the display panel 110 having a woven type touch electrode structure in the touch display device 100 according to embodiments may process sequentially a self-capacitance sensing period Ps and a mutual-capacitance sensing period Pm in a touch sensing period for detecting touch presence or not and touch coordinate.

In the self-capacitance sensing period Ps, touch driving signals TDS are supplied to each of the long touch electrode and the short touch electrode, and a change in capacitance for each touch electrode may be detected by receiving the touch sensing signal TSS transmitted from the long touch electrode or short touch electrode which the touch driving signals TDS were supplied to.

In this case, the self-capacitance sensing operation may be performed simultaneously for the long touch electrodes and the short touch electrodes included in a touch electrode group TEG, and may be performed sequentially or alternately for different touch electrode groups TEG. The self-capacitance sensing operation for different touch electrode groups TEG may vary according to a structure of channels or a touch sensing circuit connected to touch lines TL.

After the self-capacitance sensing period Ps, the mutual-capacitance sensing operation is performed on a long touch electrode (TE(1)1_L or TE(1)4_L) located at outer area within the touch electrode group TEG1 or on a short touch electrode block located at the outer area within the same touch electrode group TEG1 and connected by the same line.

For example, when a multi-touch is performed at a diagonal corner of the first touch electrode group TEG1, because a capacitance may be generated between a long touch electrode (e.g., TE(1)1_L or TE(1)4_L of the first touch electrode group TEG1 or TE(2)1_L of the second touch electrode group TEG2) at a position where the multi-touch is made and a short touch electrode adjacent to it, a ghost phenomenon in which capacitance is detected even at a location (e.g., at a diagonal position opposite to the actual touch) where a touch does not actually exist may occur.

As described above, in order to detect a ghost phenomenon appearing at a position where a touch does not actually exist (e.g., a diagonal position opposite to the actual touch) in the first touch electrode group TEG1, the long touch electrode TE(1)1_L in the row direction positioned at upper area of the first touch electrode group TEG1 and the long touch electrode TE(2)1_L positioned at upper area of the second touch electrode group TEG2 adjacent to the first touch electrode group TEG1 are used as touch driving electrodes, and the short touch electrodes connected to short touch lines TL1_S, TL4_S positioned on the left and right side of the first touch electrode group TEG1 are used as the touch sensing electrodes.

Accordingly, it is possible to reduce a ghost phenomenon occurring in the corner area of the touch electrode group TEG by supplying a touch driving signal TDS to the long touch electrode used as a touch driving electrode, and receiving a touch sensing signal TSS from the short touch electrode used as a touch sensing electrode during the mutual-capacitance sensing period Pm, as shown as Ghost Deletion in FIG. 7.

Of course, the long touch electrode to which the touch driving signal TDS is supplied is not limited to the long touch electrode located at outer area within the touch electrode group TEG1, and the short touch electrode is not limited to the short touch electrode located at outer area in order to receive the touch sensing signal TSS in the mutual-capacitance sensing operation. That is, the mutual-capacitance sensing operation may be performed by supplying the touch driving signal TDS to an arbitrary long touch electrode, and receiving the touch sensing signal TSS from a short touch electrode adjacent to the long touch electrode to which the touch driving signal TDS is supplied, or from the short touch electrode block connected by the same line in a touch electrode group TEG.

Figure 8:
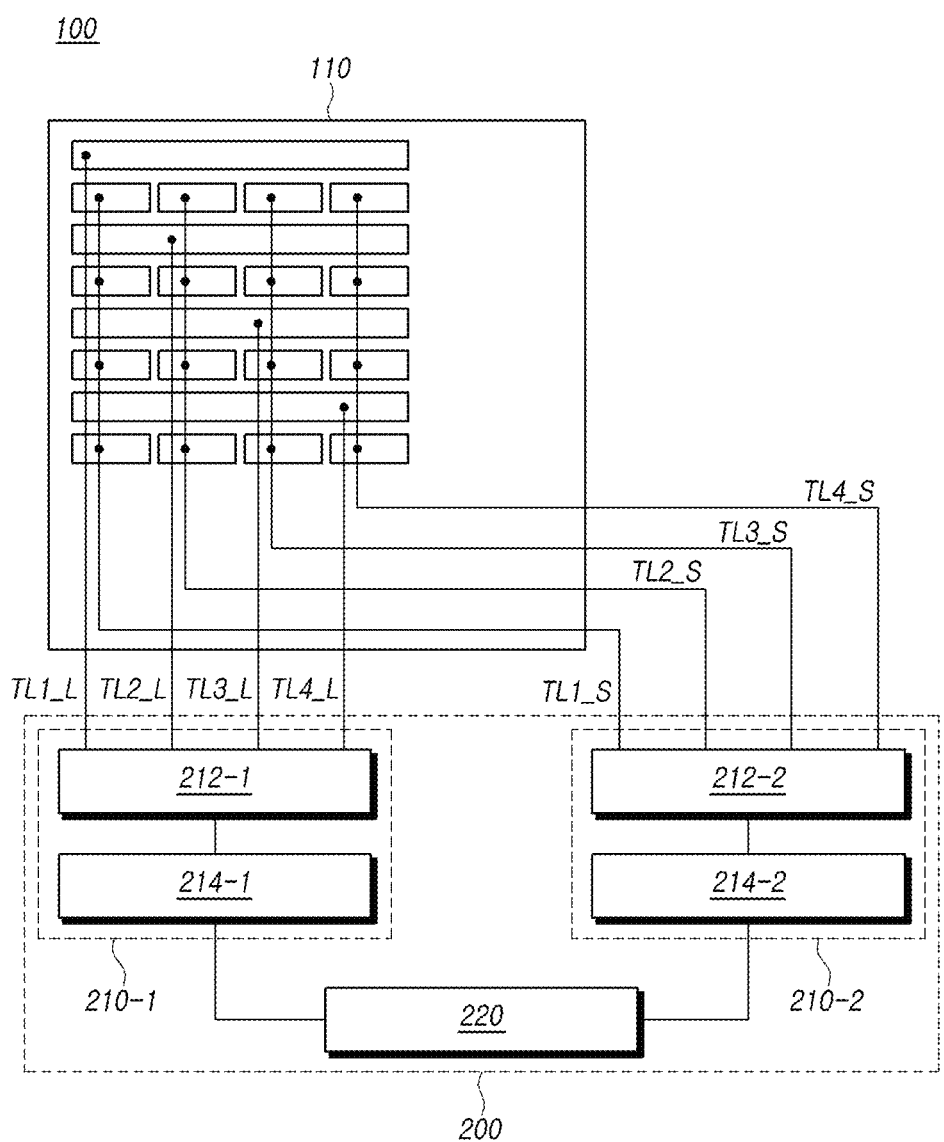
FIG. 8 illustrates a block diagram of a touch circuit in a touch display device according to embodiments.

FIG. 8 illustrates a block diagram of a touch circuit in a touch display device according to embodiments.

Referring to FIG. 8, the touch circuit 200 in the touch display device 100 according to embodiments may include a first touch sensing circuit 210-1, a second touch sensing circuit 210-2, and a touch controller 220.

The first touch sensing circuit 210-1 supplies the touch driving signal TDS to the long touch electrodes and receives the touch sensing signal TSS through the long touch lines TL1_L, TL2_L, TL3_L, TL4_L in woven type touch electrode structure constituting the display panel 110.

At this time, the first touch sensing circuit 210-1 supplies the touch driving signal TDS to the long touch electrode, and at the same time, receives the touch sensing signal TSS transmitted from the long touch electrode during the self-capacitance sensing period Ps, but just supplies the touch driving signal TDS to the long touch electrode during the mutual-capacitance sensing period Pm.

For the purpose of above, the first touch sensing circuit 210-1 may include a first switch circuit 212-1 for switching a transmission path of the touch driving signal TDS and the touch sensing signal TSS and a first touch signal control circuit 214-1 for supplying the touch driving signal TDS or receiving the touch sensing signal TSS.

The first touch sensing circuit 210-1 transmits the touch sensing signal TSS received from the long touch electrode of the display panel 110 to the touch controller 220, and the touch controller 220 detects a touch presence or not or a touch position based on the touch sensing signal TSS transmitted from the first touch sensing circuit 210-1.

In contrast, the second touch sensing circuit 210-2 supplies the touch driving signal TDS or receives the touch sensing signal TSS through short touch lines TL1_S, TL2_S, TL3_S, TL4_S connected to the short touch electrodes in woven type touch electrode structure constituting the display panel 110.

At this time, the second touch sensing circuit 210-2 supplies the touch driving signal TDS to the short touch electrodes, and at the same time, receives the touch sensing signal TSS transmitted from the short touch electrodes during the self-capacitance sensing period Ps, but just receives the touch sensing signal TSS from the short touch electrodes without supplying the touch driving signal TDS during the mutual-capacitance sensing period Pm. Therefore, it performs an operation to detect a mutual capacitance between the long touch electrodes and the short touch electrodes during the mutual-capacitance sensing period Pm.

For the purpose of above, the second touch sensing circuit 210-2 may include a second switch circuit 212-2 for switching a transmission path of the touch driving signal TDS and the touch sensing signal TSS and a second touch signal control circuit 214-2 for supplying the touch driving signal TDS or receiving the touch sensing signal TSS.

Accordingly, the second touch signal control circuit 214-2 does not generate the touch driving signal TDS during the mutual-capacitance sensing period Pm or controls the second switch circuit 212-2 to prevent the touch driving signal TDS from being supplied to the display panel 110.

The second touch sensing circuit 210-2 transmits the touch sensing signal TSS received from the short touch electrodes of the display panel 110 to the touch controller 220, and the touch controller 220 detects a touch presence or not and a touch position based on the touch sensing signal TSS transmitted from the second touch sensing circuit 210-2.

The above description illustrates an example in which self-capacitance sensing operation and mutual-capacitance sensing operation are performed together for one touch electrode group TEG having woven type touch electrode structure. However, it may be possible to selectively sense a plurality of touch electrode groups TEG through a multiplexer by connecting the plurality of touch electrode groups TEG to the multiplexer.

Figure 9:
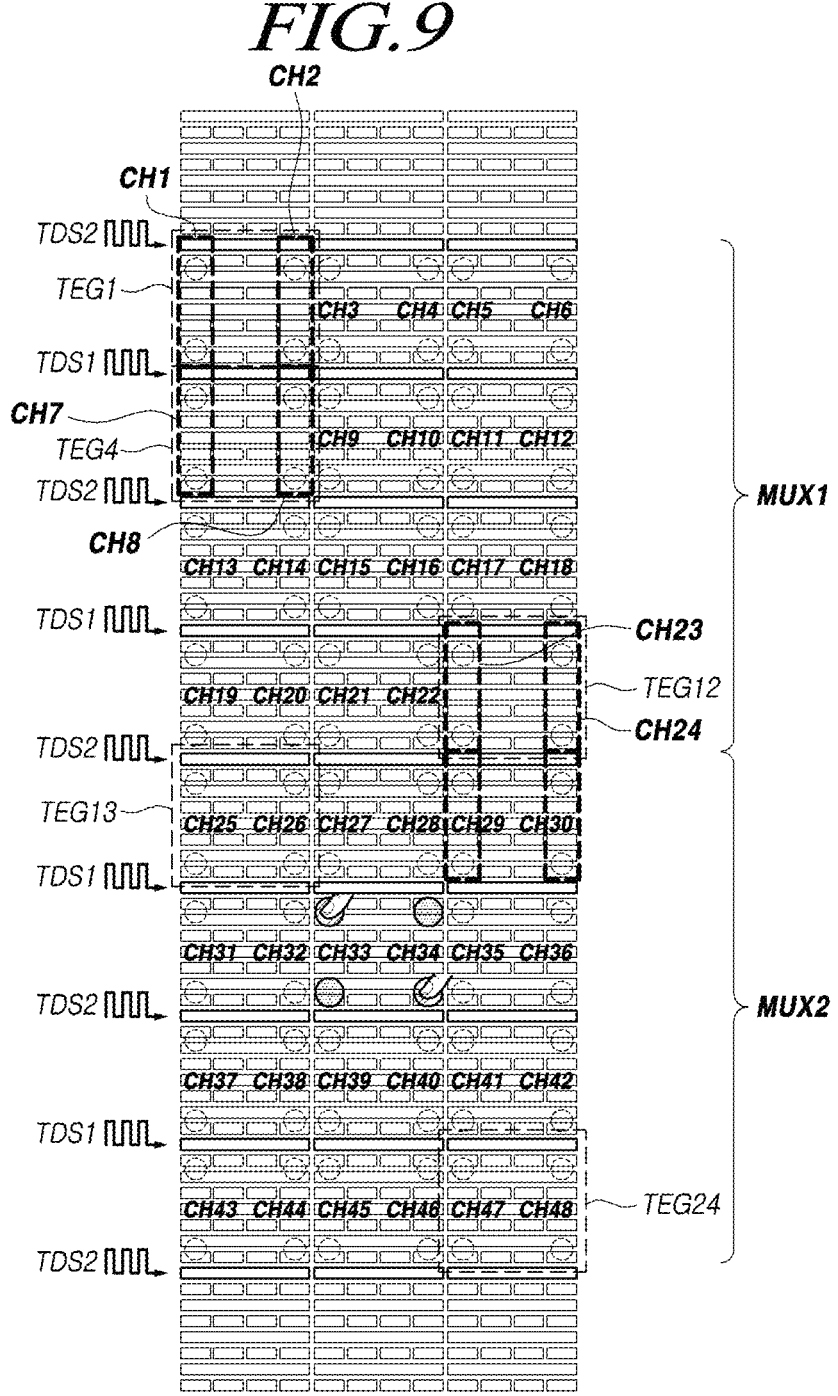
FIG. 9 illustrates a structural diagram of a display panel in which a self-capacitance sensing operation and a mutual-capacitance sensing operation are performed together for a plurality of touch electrode groups connected to a multiplexer in a touch display device according to embodiments.

FIG. 9 illustrates a structural diagram of a display panel in which a self-capacitance sensing operation and a mutual-capacitance sensing operation are performed together for a plurality of touch electrode groups connected to a multiplexer in a touch display device according to embodiments.

Referring to FIG. 9, the display panel 110 in the touch display device 100 according to embodiments may include a plurality of touch electrode groups TEG composed of a certain number of long touch electrodes and short touch electrodes. And a plurality of touch lines TL corresponding to the plurality of touch electrode groups TEG may be connected to a multiplexer.

For example, in case of the display panel 110 having 4×4 woven type touch electrode structure, 12 touch electrode groups including a first touch electrode group TEG1 to a twelfth touch electrode group TEG12 may be connected to a first multiplexer MUX1.

In this case, each of the touch electrode groups TEG1-TEG12 may include 2 touch channels for transmitting touch signals to 2 short touch electrode blocks connected by same line in outer area of the touch electrode group TEG for removing a ghost.

Accordingly, 24 touch channels CH1-CH24 extending from each of the touch electrode groups TEG1-TEG12 may be connected to the first multiplexer MUX1.

Considering 2 touch electrode groups (e.g., TEG1 and TEG4) adjacent in the column direction, a touch driving signal (e.g., TDS1) may be supplied to long touch electrodes (e.g., a long touch electrode positioned below TEG1 and a long touch electrode positioned above TEG4) close to an adjacent area of 2 touch electrode groups (e.g., TEG1 and TEG4).

Then, the touch sensing signals TSS are detected from the touch channels (e.g., CH1, CH2, CH7, CH8) connected to short touch electrodes positioned at outer area among the plurality of short touch electrodes in the adjacent touch electrode groups (e.g., TEG1 and TEG4). Thus, efficient mutual-capacitance sensing operation may be performed.

In other word, a touch driving signal (e.g., TDS1) may be supplied to a long touch electrode located in the adjacent area for 2 touch electrode groups (e.g., TEG1 and TEG4) adjacent in the column direction, and a touch sensing signal TSS may be received from 4 short touch electrodes adjacent to the long touch electrode to which the touch driving signal (e.g., TDS1) was supplied. As a result, a mutual-capacitance sensing operation may be effectively performed for touch electrode groups TEG in the display panel 110.

Above description illustrates that when the mutual-capacitance sensing operation is performed on a plurality of touch electrode groups TEG1-TEG12 connected to a multiplexer (e.g., MUX1), the touch sensing signal TSS is received from the short touch electrodes in adjacent touch electrode group (e.g., TEG1 and TEG4) in the column direction by applying the touch driving signal TDS to a long touch electrode located lower side of a touch electrode group (e.g., TEG1) located in a first row.

However, the long touch electrode positioned between the touch electrode groups (e.g., TEG1 and TEG4) adjacent to each other in the column direction may be the long touch electrode located lower side of the first touch electrode group TEG1 but may be a long touch electrode located upper side of the fourth touch electrode group TEG4.

On the other hand, the adjacent touch electrode groups in the column direction selected for mutual-capacitance sensing operation may be the first touch electrode group (e.g., TEG1) in the first row and the fourth touch electrode group (e.g., TEG4) in the second row among the 12 touch electrode groups TEG1-TEG12 connected to the same multiplexer (e.g., MUX1). Otherwise, they may be the fourth touch electrode group (e.g., TEG4) in the second row and the seventh touch electrode group (e.g., TEG7) in the third row.

As described above, the adjacent touch electrode groups in the column direction selected for mutual-capacitance sensing operation may be a touch electrode group in odd-numbered row and a touch electrode group in even-numbered row, or may be a touch electrode group in even-numbered row and a touch electrode group in odd numbered row.

Figure 10:
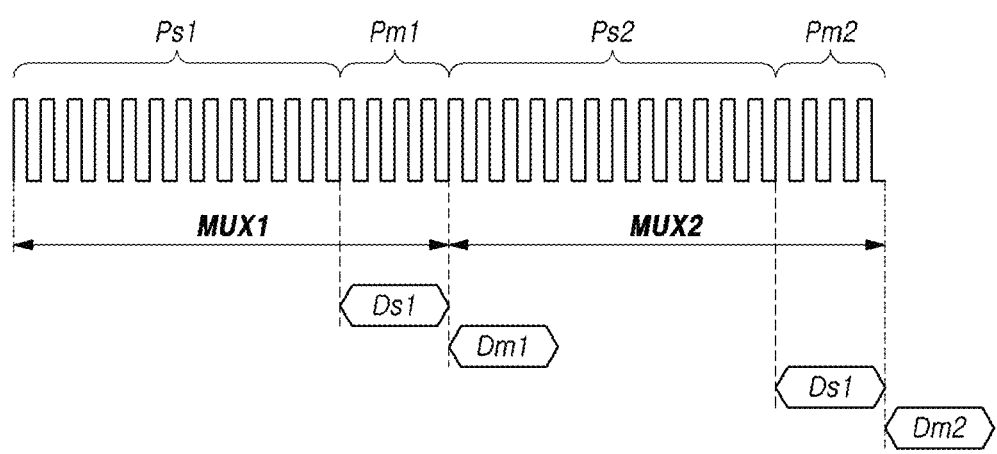
FIG. 10 illustrates a signal diagram in case that a self-capacitance sensing operation and a mutual-capacitance sensing operation are performed together for each multiplexer connected to a plurality of touch electrode groups as a unit in a touch display device according to embodiments.

FIG. 10 illustrates a signal diagram in case that a self-capacitance sensing operation and a mutual-capacitance sensing operation are performed together for each multiplexer connected to a plurality of touch electrode groups as a unit in a touch display device according to embodiments.

Referring to FIG. 10, the self-capacitance sensing operation may be performed for a plurality of touch electrode groups TEG connected to the first multiplexer MUX1 during the self-capacitance sensing period Ps1 in the touch display device 100 according to embodiments.

Then, the touch driving signal TDS is supplied to the selected long touch electrode and the touch sensing signal TSS is received from 4 short touch electrodes adjacent to the long touch electrode during the mutual-capacitance sensing period Pm1. At this time, an operation of receiving the touch sensing signal TSS from the short touch electrodes with the same line and operations of converting the touch sensing signal TSS received in previous self-capacitance sensing period Ps1 into digital sensing data Ds1 and transmitting the digital sensing data Ds1 to the touch controller 220 may be performed together during the mutual-capacitance sensing period Pm1.

Likewise, the touch sensing signal TSS received in the mutual-capacitance sensing period Pm1 may be converted into digital sensing data Dm1 and transmitted to the touch controller 220 after the mutual-capacitance sensing period Pm1 is finished.

In the case of sequentially driving a plurality of multiplexers (e.g., MUX1 and MUX2), the self-capacitance sensing period Ps1 and the mutual-capacitance sensing period Pm1 may be first progressed for the touch electrode groups TEG1-TEG12 connected to a first multiplexer MUX1 during the first multiplexer MUX1 is turned on. And then, a self-capacitance sensing period Ps2 and a mutual-capacitance sensing period Pm2 may be sequentially progressed for the touch electrode groups TEG13-TEG24 connected to a second multiplexer MUX2 during the second multiplexer MUX2 is turned on.

As described above, the self-capacitance sensing period Ps and the mutual-capacitance sensing period Pm may be sequentially progressed for the long touch electrodes and the short touch electrodes of the selected touch electrode group TEG during one touch sensing period. As a result, it is possible to detect a touch electrode TE in which the ghost phenomenon occurs by multi-touch in the touch electrode group TEG and remove the ghost phenomenon.

Meanwhile, the touch display device 100 according to embodiments may alternately perform display driving operation and touch driving operation. In this way, a method in which the display driving operation for displaying image and the touch driving operation for sensing a touch are performed alternately is referred to as a time-division driving method.

According to the time-division driving method, a display driving period for displaying image and a touch driving operation for sensing a touch are alternately performed. The touch display device 100 may perform the display driving operation during the display driving period, and may perform the touch driving operation during the touch driving period.

As an example of the time-division driving method, time of a frame may be divided into a display driving period and a touch driving period, or may be divided into two or more display driving periods and one or more touch driving periods.

Alternatively, the touch display device 100 according to embodiments may independently perform the display driving operation and the touch driving operation. In this way, a method in which the display driving operation for displaying image and the touch driving operation for sensing a touch are independently performed is referred to as a time-free driving method.

According to the time-free driving method, the display driving operation for displaying image and the touch driving operation for sensing a touch may be performed simultaneously. In addition, only the display driving operation for displaying image or only the touch driving operation for sensing a touch may be performed during a certain period.

On the other hand, the touch display device 100 according to the embodiments may effectively reduce the ghost phenomenon by performing self-capacitance sensing operation and mutual capacitance sensing operation together at a central area of the touch electrode group TEG where ghost phenomenon occurs at the central area of touch electrode group TEG.

Figure 11:
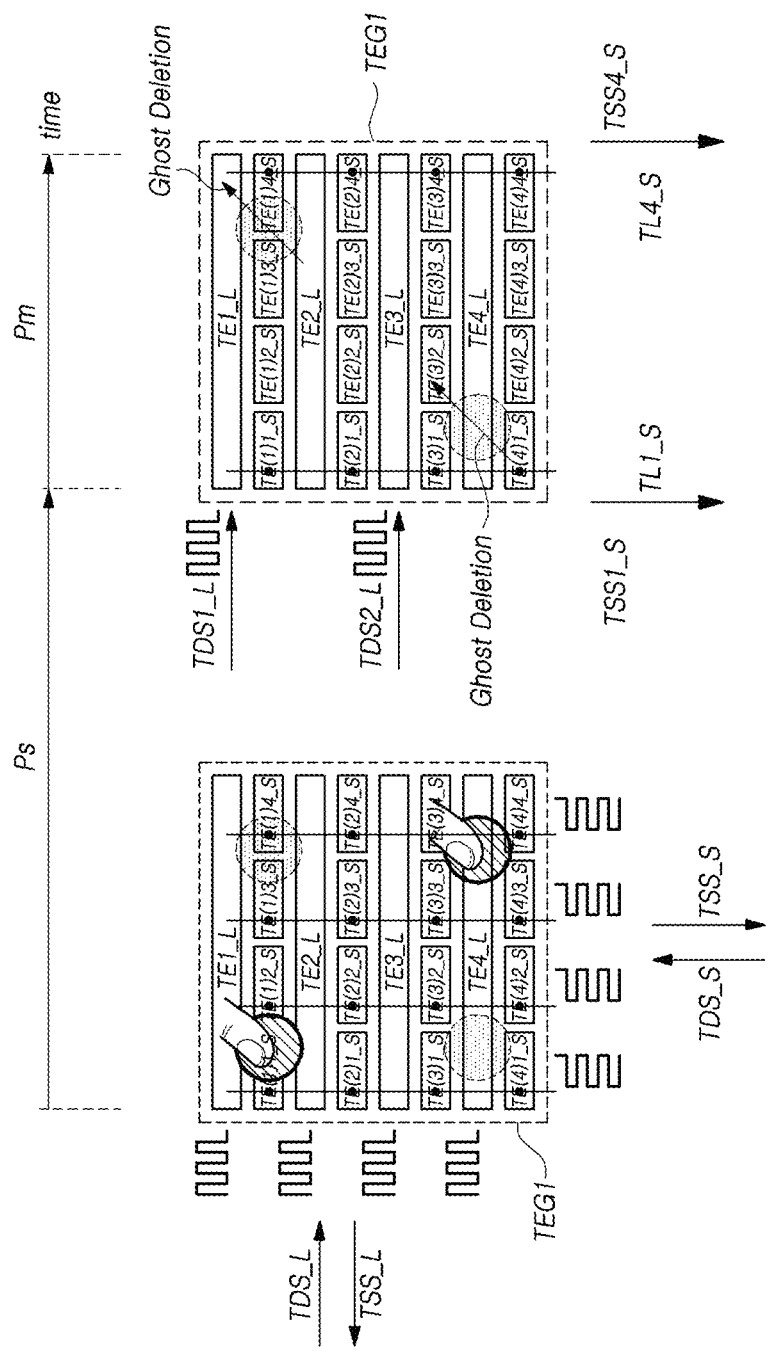
FIG. 11 illustrates a conceptual diagram of a method of performing a self-capacitance sensing operation and a mutual-capacitance sensing operation together in a touch electrode group with a woven type touch electrode structure in a touch display device according to embodiments.

FIG. 11 illustrates a conceptual diagram of a method of performing a self-capacitance sensing operation and a mutual-capacitance sensing operation together in a touch electrode group with a woven type touch electrode structure in a touch display device according to embodiments.

Referring to FIG. 11, the display panel 110 having a woven type touch electrode structure in the touch display device 100 according to embodiments performs sequentially the self-capacitance sensing period Ps and the mutual-capacitance sensing period Pm for an arbitrary touch electrode group TEG1 in a touch sensing period for detecting a touch presence or not and a touch coordinate on the touch electrodes TE.

In the self-capacitance sensing period Ps, long touch driving signals TDS_L and short touch driving signals TDS_S are supplied to each of the long touch electrodes TE1_L-TE4_L and the short touch electrodes TE(1)1_S-TE(4)4_S, and a change in capacitance for each touch electrode may be detected by receiving the touch sensing signals TSS_L, TSS_S transmitted from the long touch electrode which the long touch driving signal TDS_L is supplied to or the short touch electrode which the short touch driving signal TDS_S is supplied to.

In this case, the self-capacitance sensing operation may be performed simultaneously for the long touch electrodes TE1_L-TE4_L and the short touch electrodes TE(1)1_S-TE(4)4_S included in a touch electrode group TEG, and may be performed sequentially or alternately for different touch electrode groups TEG. The self-capacitance sensing operation for different touch electrode groups TEG may vary according to a structure of channels or a touch sensing circuit connected to touch lines TL.

After the self-capacitance sensing period Ps, the mutual-capacitance sensing operation is performed on a long touch electrode (TE1_L or TE4_L) located at outer area among the plurality of long touch electrodes TE1_L-TE4_L within the touch electrode group TEG1 or on short touch electrodes located at the outer area within the same touch electrode group TEG1 and connected by a same line.

For example, when a multi-touch is performed at a diagonal corner of the first touch electrode group TEG1, because a capacitance may be generated between a long touch electrode (e.g., TE(1)1_L or TE(1)4_L of the first touch electrode group TEG1 or TE(2)1_L of the second touch electrode group TEG2, see FIG. 7) at a position where the multi-touch is made and a short touch electrode adjacent to it, a ghost phenomenon in which the capacitance is detected even at a location (e.g., at a diagonal position opposite to the actual touch) where a touch does not actually exist may occur.

As described above, in order to detect a ghost phenomenon appearing at a position (e.g., a diagonal position opposite to the actual touch) where a touch does not actually exist in the first touch electrode group TEG1, a long touch electrode (e.g., TE1_L or TE3_L) in the first touch electrode group TEG1 may be used as a touch driving electrode, and short touch electrodes connected to some short touch lines (e.g., TL1_S, and TL4_S) of the first touch electrode group TEG1 may be used as the touch sensing electrodes.

Accordingly, it is possible to reduce a ghost phenomenon occurred in the touch electrode group TEG by sequentially supplying the touch driving signals TDS1_L, TDS3_L to the long touch electrodes TE1_L, TE3_L used as touch driving electrodes, and receiving touch sensing signals TSS1_S, TSS4_S from the short touch electrodes (e.g., TE(1)1_S, TE(2)1_S, TE(3)1_S, TE(4)1_S and TE(1)4_S, TE(2)4_S, TE(3)4_S, TE(4)4_S) which are connected by the same lines and used as the touch sensing electrodes during the mutual-capacitance sensing period Pm.

In this case, since the short touch electrodes which are connected by the same lines and used as the touch sensing electrodes may be adjacent in the vertical direction based on the long touch electrodes TE1_L, TE3_L used as the touch driving electrodes, it may be effective to select the long touch electrodes, which the touch driving signals TDS are supplied in the mutual-capacitance sensing period Pm in a touch electrode group TEG1, for every two long touch electrodes.

Here, it illustrates a case where the touch driving signals TDS1, TDS3 are sequentially supplied to a first long touch electrode TE1_L and a third long touch electrode TE3_L.

Of course, the long touch electrode, which the long touch driving signal TDS_L is supplied, is not limited to the long touch electrode located at outer area within the touch electrode group TEG1, and the short touch electrodes are not limited to the short touch electrodes located at outer area in order to receive the touch sensing signals TSS1_S, TSS4_S in the mutual-capacitance sensing operation. That is, the mutual-capacitance sensing operation may be performed by supplying the long touch driving signal TDS_L to an arbitrary long touch electrode, and receiving the short touch sensing signals TSS1_S, TSS4_S from the short touch electrodes adjacent to the long touch electrode to which the long touch driving signal TDS_L is supplied, or from the short touch electrodes connected by the same line in a touch electrode group TEG.

Figure 12:
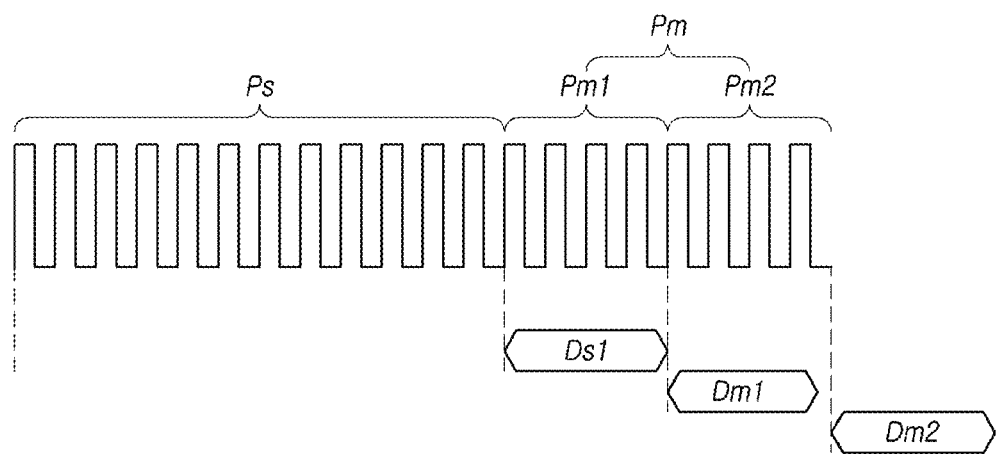
FIG. 12 illustrates a signal diagram in case that a self-capacitance sensing operation and a mutual-capacitance sensing operation are performed together in a touch electrode group in a touch display device according to embodiments.

FIG. 12 illustrates a signal diagram in case that a self-capacitance sensing operation and a mutual-capacitance sensing operation are performed together in a touch electrode group in a touch display device according to embodiments.

Referring to FIG. 12, the touch display device 100 according to embodiments performs the self-capacitance sensing operation for a selected touch electrode group TEG among a plurality of touch electrode groups TEG constituting the display panel 110 during the self-capacitance sensing period Ps.

Then, the touch display device 100 supplies the touch driving signal TDS to a long touch electrode selected in the touch electrode group TEG, and at the same time, receives the touch sensing signal TSS transmitted from the short touch electrodes adjacent to the long touch electrode during the mutual-capacitance sensing period (Pm1 or Pm2).

For example, in case of a touch electrode group TEG with a 4×4 woven type touch electrode structure, the touch driving signals TDS1, TDS3 may be sequentially supplied to the first long touch electrode TE1_L and the third long touch electrode TE3_L. Thus, the mutual-capacitance sensing period Pm may be comprised of a first mutual-capacitance sensing period Pm1 for the short touch electrodes TE(1)1_S-TE(1)4_S adjacent to the first long touch electrode TE1_L, and a second mutual-capacitance sensing period Pm2 for the short touch electrodes TE(2)1_S-TE(2)4_S adjacent to the third long touch electrode TE3_L.

At this time, the touch display device 100 may receive the touch sensing signal TSS for the short touch electrode, and at the same time, convert the touch sensing signal TSS received in the previous self-capacitance sensing period Ps into a digital sensing data Ds1 and supply it to the touch controller 220 during the first mutual-capacitance sensing period Pm1.

Likewise, the touch display device 100 may convert the touch sensing signal TSS received in the first mutual-capacitance sensing period Pm1 into a digital sensing data Dm1 and supply it to the touch controller 220 during the second mutual-capacitance sensing period Pm2.

As described above, the self-capacitance sensing period Ps and the mutual-capacitance sensing period Pm are sequentially performed for the long touch electrodes and the short touch electrodes of the selected touch electrode group TEG during a touch sensing period. As a result, it is possible to detect a touch electrode TE in which the ghost phenomenon occurs in the touch electrode group TEG by multi-touch and remove the ghost phenomenon.

On the other hand, it is also possible to supply the touch driving signals TDS1-TDS4 for all long touch electrodes (e.g., TE1_L-TE4_L) included in the touch electrode group TEG during the mutual-capacitance sensing period Pm in order to improve the accuracy of ghost detection.

Figure 13:
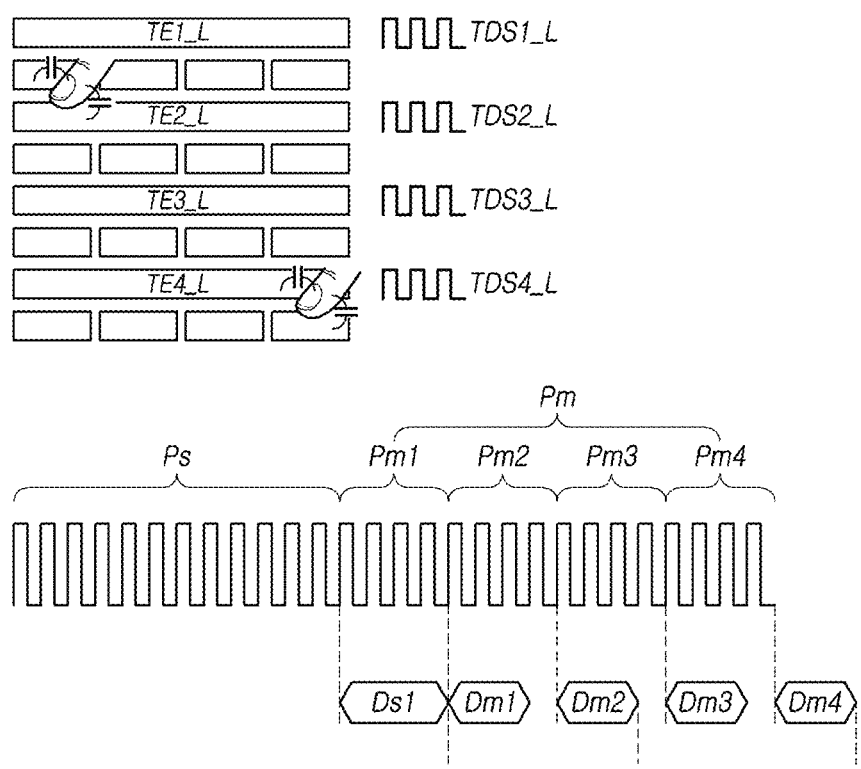
FIG. 13 illustrates a touch electrode group and a signal diagram in case that touch driving signals are supplied to all long touch electrodes in a mutual-capacitance sensing period in a touch electrode group in a touch display device according to embodiments.

FIG. 13 illustrates a touch electrode group and a signal diagram in case that touch driving signals are supplied to all long touch electrodes in a mutual-capacitance sensing period in a touch electrode group in a touch display device according to embodiments.

Referring to FIG. 13, the self-capacitance sensing operation may be performed for a selected touch electrode group TEG among a plurality of touch electrode groups TEG constituting the display panel 110 in the touch display device 100 according to embodiments during the self-capacitance sensing period Ps.

Then, the touch display device 100 supplies sequentially the long touch driving signals TDS1_L-TDS4_L to all the long touch electrodes TE1_L-TE4_L in the touch electrode group TEG respectively, and receives the short touch sensing signals TSS transmitted from the short touch electrodes during the mutual-capacitance sensing period Pm.

For example, in the case of a touch electrode group TEG having a 4×4 woven type touch electrode structure, the long touch driving signals TDS1_L-TDS4_L are sequentially supplied to a first long touch electrode TE1_L, a second long touch electrode TE2_L, a third long touch electrode TE3_L, and a fourth long touch electrode TE4_L.

Accordingly, the mutual-capacitance sensing period Pm may include a first mutual-capacitance sensing period Pm1 for the first long touch electrode TE1_L and the short touch electrodes, a second mutual-capacitance sensing period Pm2 for the second long touch electrode TE2_L and the short touch electrodes, a third mutual-capacitance sensing period Pm3 for the third long touch electrode TE3_L and the short touch electrodes, and a fourth mutual-capacitance sensing period Pm4 for the fourth long touch electrode TE4_L and the short touch electrodes.

At this time, the touch display device 100 may receive the touch sensing signal TSS for the short touch electrodes, and at the same time, convert the touch sensing signal TSS received in the previous self-capacitance sensing period Ps into a digital sensing data Ds1 to transmit it to the touch controller 220 during the first mutual-capacitance sensing period Pm1.

Likewise, the touch display device 100 may convert the touch sensing signal TSS received in the first mutual-capacitance sensing period Pm1 into a digital sensing data Dm1 and transmit it to the touch controller 220 during the second mutual-capacitance sensing period Pm2.

In addition, the touch display device 100 may convert the touch sensing signal TSS received in the second mutual-capacitance sensing period Pm2 into a digital sensing data Dm2 and transmit it to the touch controller 220 during the third mutual-capacitance sensing period Pm3. And, the touch display device 100 may convert the touch sensing signal TSS received in the third mutual-capacitance sensing period Pm3 into a digital sensing data Dm3 and transmit it to the touch controller 220 during the fourth mutual-capacitance sensing period Pm4.

As described above, it is possible to detect a touch electrode TE in which the ghost phenomenon occurs in the touch electrode group TEG by multi-touch and remove the ghost phenomenon by proceeding sequentially the self-capacitance sensing period Ps and the mutual-capacitance sensing period Pm for the long touch electrodes and the short touch electrodes of the selected touch electrode group TEG within a touch sensing period.

Meanwhile, the touch display device 100 according to embodiments may include a touch power integrated circuit TPIC for generating the touch driving signal TDS and a power management integrated circuit PMIC for supplying a power together with the timing controller 140.

For example, the timing controller 140, the touch power integrated circuit TPIC, and the power management integrated circuit PMIC may be mounted together on a printed circuit board PCB and connected to the display panel 110 through cables.

Figure 14:
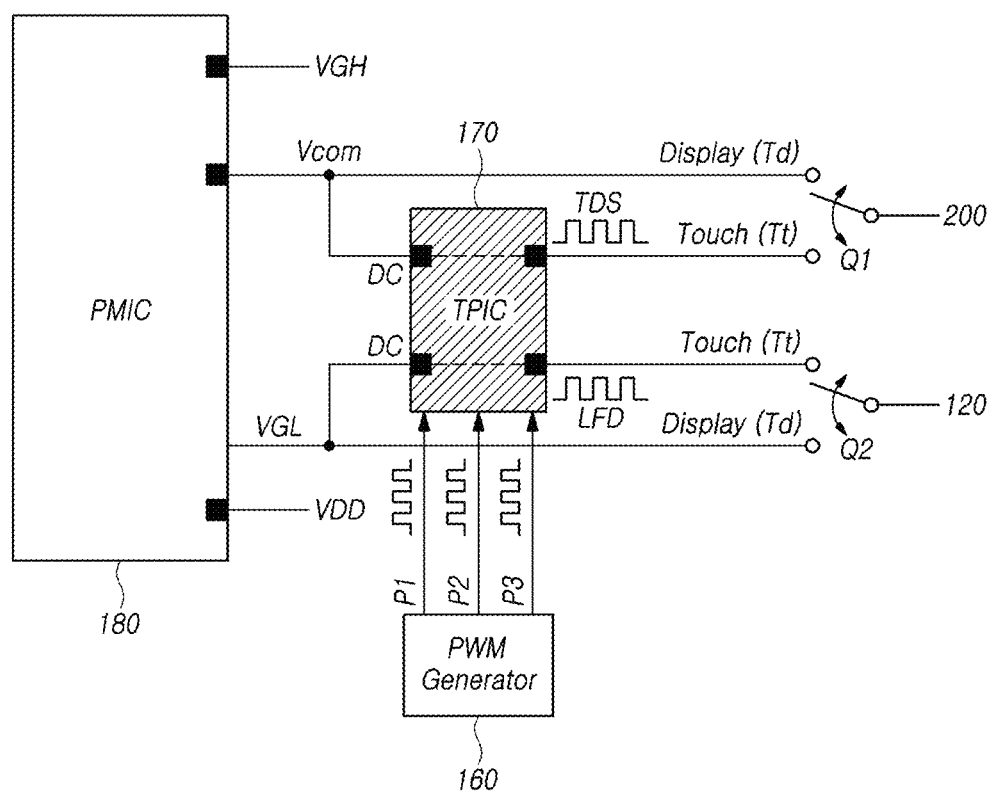
FIG. 14 illustrates a block diagram corresponding to a process of generating a touch driving signal in a touch power integrated circuit in a touch display device according to embodiments.

FIG. 14 illustrates a block diagram corresponding to a process of generating a touch driving signal in a touch power integrated circuit in a touch display device according to embodiments.

Referring to FIG. 14, the touch circuit 200 in the touch display device 100 according to embodiments supplies the touch driving signal TDS transmitted from the touch power integrated circuit 170 to the selected touch electrode TE through a first switch element Q1, and detects the touch sensing signal TSS by accumulating a capacitance received from the touch electrode TE during a touch driving period Tt.

On the other hand, the touch circuit 200 is disconnected from the touch line TL and a common voltage Vcom is supplied to the touch electrode TE during a display driving period Td through the first switch element Q1.

Meanwhile, the display driving circuit 120 may supply a load-free driving signal LFD to the gate line or the data line by connecting the touch power integrated circuit 170, which generates the load-free driving signal LFD, to the gate line or the data line during the touch driving period Tt through a second switch element Q2. In this case, the display driving circuit 120 is electrically disconnected from the touch power integrated circuit 170 during the display driving period Td.

The touch power integrated circuit 170 may generate the touch driving signal TDS by using pulse width modulation signals P1, P2, P3 supplied from the pulse width modulation signal generating circuit (PWM Generator) 160. For this purpose, the pulse width modulation signal generating circuit 160 may generate a first pulse width modulated signal P1, a second pulse width modulation signal P2, and a third pulse width modulated signal P3 having the same phase. The pulse width modulation signal generating circuit 160 may be mounted in the micro control unit 150.

For example, the touch power integrated circuit 170 may generate the touch driving signal TDS having an amplitude between a low level common voltage and a high level common voltage based on the first pulse width modulation signal P1 and generate the load-free driving signal LFD having the same amplitude as the touch driving signal TDS by using the second pulse width modulation signal P2 or the third pulse width modulation signal P3.

The touch power integrated circuit 170 may receive a gate low voltage VGL with a DC level and the common voltage Vcom from the power management integrated circuit 180. The gate low voltage VGL is a voltage capable of turning off a thin film transistor in the display panel 110.

The touch power integrated circuit 170 may generate the touch driving signal TDS by shifting a level of the first pulse width modulation signal P1 supplied from the pulse width modulation signal generating circuit 160 based on the common voltage Vcom, and generate the load-free driving signal LFD by shifting a level of the second pulse width modulation signal P2 or the third pulse width modulation signal P3 supplied from the pulse width modulation signal generating circuit 160 based on the common voltage Vcom.

The touch power integrated circuit 170 may equally control the amplitude of the touch driving signal TDS and the load-free driving signal LFD so as to correspond to the gate low voltage VGL and a gate high voltage VGH.

In this case, the power management integrated circuit 180 may generate the gate high voltage VGH during the display driving period Td in which the data voltages are supplied to the subpixels. The gate high voltage VGH is a voltage capable of turning on the thin film transistor in the display panel 110 during the display driving period Td.

At this time, the touch display device 100 according to embodiments may sequentially perform the self-capacitance sensing operation and the mutual-capacitance sensing operation during the touch driving period Tt. Thus, the long touch driving signal supplied to the long touch electrode through the first touch sensing circuit 210-1 and the short touch driving signal supplied to the short touch electrode through the second touch sensing circuit 210-2 may be different from each other.

Therefore, it is necessary to separate and generate the long touch driving signal supplied to the long touch electrode and the short touch driving signal supplied to the short touch electrode. The touch power integrated circuit 170 may generate them respectively, or the touch circuit 200 may respectively generate them by using the touch driving signal TDS supplied from the touch power integrated circuit 170.

Figure 15:
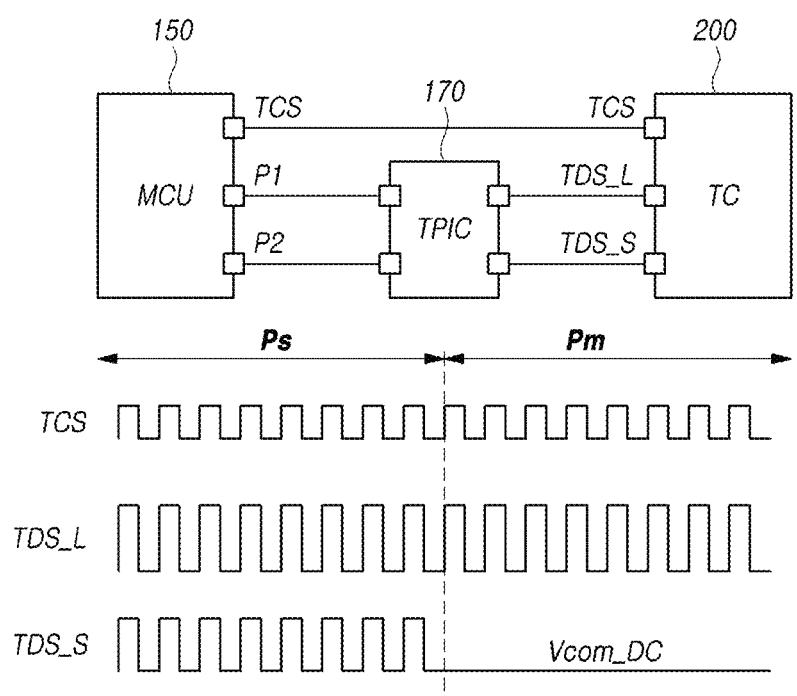
FIG. 15 illustrates a block diagram and a signal diagram in case that a long touch driving signal and a short touch driving signal are generated by a touch power integrated circuit in a touch display device according to embodiments.

FIG. 15 illustrates a block diagram and a signal diagram in case that a long touch driving signal and a short touch driving signal are generated by a touch power integrated circuit in a touch display device according to embodiments.

Referring to FIG. 15, the touch display device 100 according to embodiments may include a micro control unit 150, a touch power integrated circuit 170, and a touch circuit 200.

The touch circuit 200 supplies a long touch driving signal TDS_L and a short touch driving signal TDS_S to the long touch electrodes and the short touch electrodes constituting the touch electrode group TEG in the display panel 110, respectively. Then, the touch circuit 200 receives the touch sensing signal TSS from the display panel 110 and detects the touch presence or not and touch coordinates based on the touch sensing signal TSS.

The touch power integrated circuit 170 receives the first pulse width modulation signal P1 and the second pulse width modulation signal P2 from the micro control unit 150, and generates the long touch driving signal TDS_L to be supplied to the long touch electrodes and the short touch driving signal TDS_S to be supplied to the short touch electrodes.

In this case, the micro control unit 150 may supply a touch timing control signal TCS to the touch circuit 200 to control a touch timing of the touch circuit 200. The long touch driving signal TDS_L and the short touch driving signal TDS_S may be synchronized with the touch timing control signal TCS.

As described above, the touch display device 100 according to embodiments sequentially proceeds the self-capacitance sensing period Ps and the mutual-capacitance sensing period Pm within the touch driving period Tt.

Since the self-capacitance sensing operation is performed for the long touch electrodes and the short touch electrodes during the self-capacitance sensing period Ps, the long touch driving signal TDS_L and the short touch driving signal TDS_S are respectively supplied to the long touch electrodes and the short touch electrodes.

In this case, since a size of the long touch electrode is larger than a size of the short touch electrode, the long touch driving signal TDS_L may have a larger amplitude than the short touch driving signal TDS_S or may be the same.

On the other hand, the long touch driving signal TDS_L is supplied to the long touch electrodes, but the short touch driving signal TDS_S is not supplied to the short touch electrodes during the mutual-capacitance sensing period Pm. Therefore, the long touch electrodes serve as the touch driving electrodes, and the short touch electrodes serve as the touch sensing electrodes during the mutual-capacitance sensing period Pm, and the touch presence or not or touch coordinate is detected using the touch sensing signal TSS transmitted from the short touch electrodes during the mutual-capacitance sensing period Pm.

At this time, a pulse type touch driving signal is not supplied to the short touch electrodes, but a DC signal having a constant value, for example, a common voltage with a DC level Vcom_DC may be supplied to the short touch electrodes during the mutual-capacitance sensing period Pm.

Figure 16:
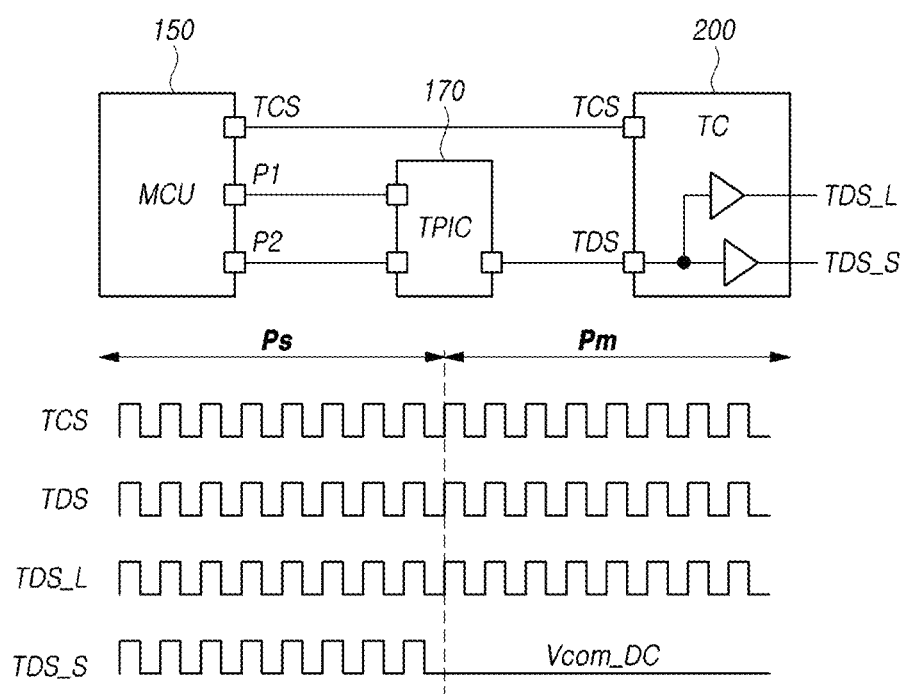
FIG. 16 illustrates a block diagram and a signal diagram in case that a long touch driving signal and a short touch driving signal are generated by a touch circuit in a touch display device according to embodiments.

FIG. 16 illustrates a block diagram and a signal diagram in case that a long touch driving signal and a short touch driving signal are generated by a touch circuit in a touch display device according to embodiments.

Referring to FIG. 16, the touch display device 100 according to embodiments may include a micro control unit 150, a touch power integrated circuit 170, and a touch circuit 200.

The micro control unit 150 may supply a touch timing control signal TCS to the touch circuit 200 in order to control the touch timing of the touch circuit 200. The long touch driving signal TDS_L and the short touch driving signal TDS_S may be synchronized with the touch timing control signal TCS.

The touch power integrated circuit 170 receives the first pulse width modulation signal P1 or the second pulse width modulation signal P2 from the micro control unit 150, and generates the touch driving signal TDS based on it.

The touch circuit 200 divides the touch driving signal TDS supplied from the touch power integrated circuit 170 into the long touch driving signal TDS_L and the short touch driving signal TDS_S. In this case, the touch circuit 200 may divide the touch driving signal TDS transmitted from the touch power integrated circuit 170 into the long touch driving signal TDS_L and the short touch driving signal TDS_S through a circuit element serving as a buffer. The short touch driving signal TDS_S may be controlled so that it is not supplied to the display panel 110 during the mutual-capacitance sensing period Pm.

Accordingly, the touch circuit 200 supplies the long touch driving signal TDS_L and the short touch driving signal TDS_S to the long touch electrodes and the short touch electrodes constituting the touch electrode group TEG in the display panel 110, respectively. Also, the touch circuit 200 receives the touch sensing signal TSS transmitted from the display panel 110, and detects the touch presence or not and touch coordinates based on the touch sensing signal TSS.

As described above, the touch display device 100 according to embodiments sequentially proceeds the self-capacitance sensing period Ps and the mutual-capacitance sensing period Pm within the touch driving period Tt.

Since the self-capacitance sensing operation is performed for the long touch electrodes and the short touch electrodes during the self-capacitance sensing period Ps, the long touch driving signal TDS_L and the short touch driving signal TDS_S are respectively supplied to the long touch electrodes and the short touch electrodes.

In this case, since the size of the long touch electrode is larger than the size of the short touch electrode, the long touch driving signal TDS_L may have a larger amplitude than the short touch driving signal TDS_S or may be the same.

On the other hand, the long touch driving signal TDS_L is supplied to the long touch electrodes, but the short touch driving signal TDS_S is not supplied to the short touch electrodes during the mutual-capacitance sensing period Pm. Therefore, the long touch electrodes serve as the touch driving electrodes, and the short touch electrodes serve as the touch sensing electrodes during the mutual-capacitance sensing period Pm, and the touch presence or not or touch coordinates are detected using the touch sensing signal TSS transmitted from the short touch electrodes during the mutual-capacitance sensing period Pm.

At this time, a pulse type touch driving signal is not supplied to the short touch electrodes, but a DC signal having a constant value, for example, a common voltage with a DC level Vcom_DC may be supplied to the short touch electrodes during the mutual-capacitance sensing period Pm.

On the other hand, the short touch driving signal TDS_S is supplied to the short touch electrodes during the self-capacitance sensing period Ps, but the common voltage with a DC level Vcom_DC may be supplied to the short touch electrodes during the mutual-capacitance sensing period Pm.

For this purpose, the second switch circuit 212-2 or the second touch signal control circuit 214-2 constituting the second touch sensing circuit 210-2 may include a configuration for supplying the short touch driving signal.

Figure 17:
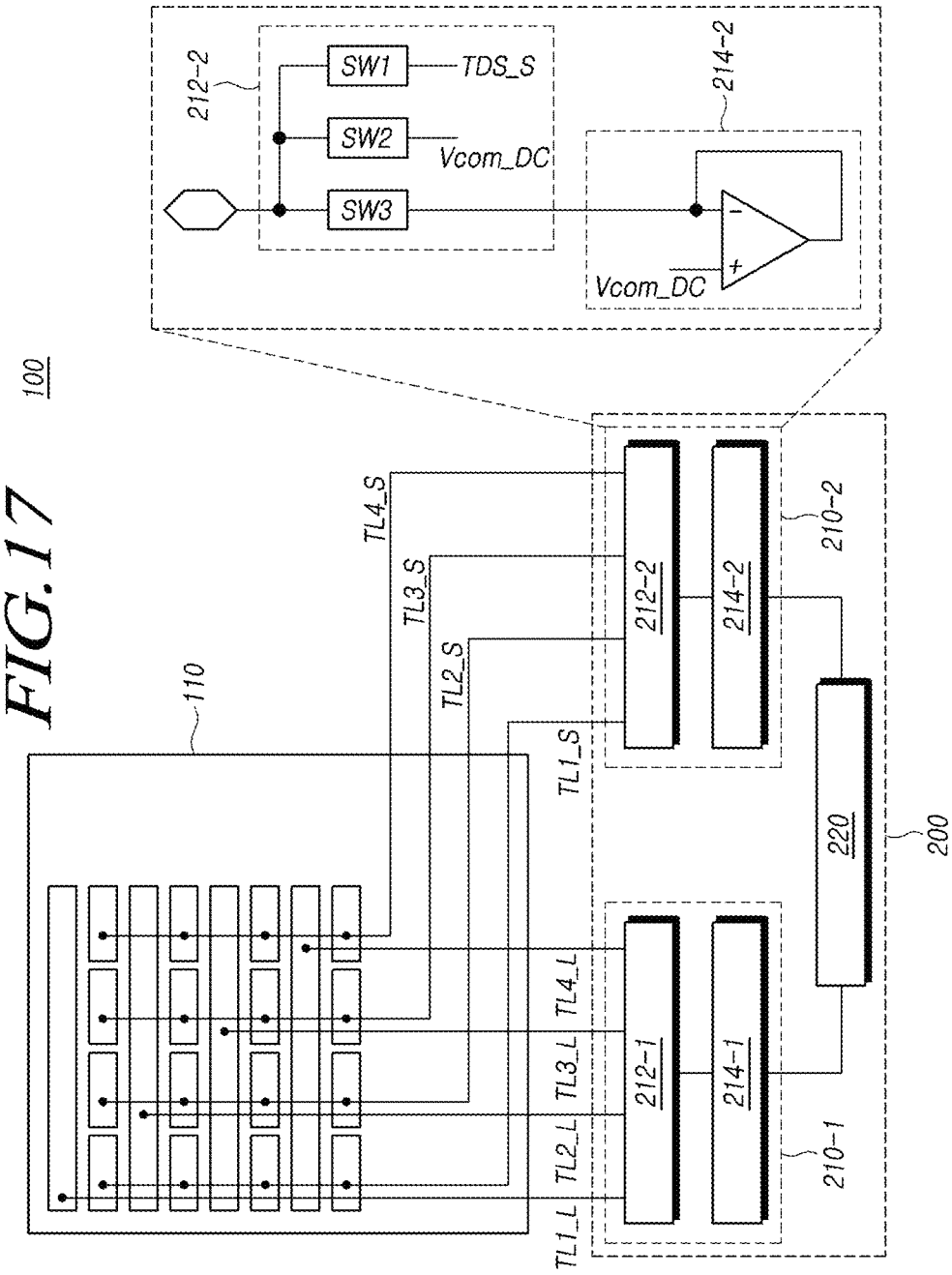
FIG. 17 illustrates a circuit diagram in configuration of supplying a short touch driving signal into a second switch circuit constituting a second touch sensing circuit in a touch display device according to embodiments.

FIG. 17 illustrates a circuit diagram in configuration of supplying a short touch driving signal into a second switch circuit constituting a second touch sensing circuit in a touch display device according to embodiments.

Referring to FIG. 17, the touch circuit 200 in the touch display device 100 according to embodiments may include the first touch sensing circuit 210-1 for supplying the long touch driving signals TDS_L to the long touch electrodes, the second touch sensing circuit 210-2 for supplying the short touch driving signals TDS_S to the short touch electrodes, and the touch controller 220.

At this time, since the self-capacitance sensing operation is performed for the long touch electrodes and the short touch electrodes during the self-capacitance sensing period Ps, the long touch driving signals TDS_L and the short touch driving signals TDS_S are supplied together to the long touch electrodes and the short touch electrodes respectively.

On the other hand, the long touch driving signals TDS_L are supplied to the long touch electrodes, but the common voltage of DC level Vcom_DC instead of the short touch driving signal TDS_S may be supplied to the short touch electrodes during the mutual-capacitance sensing period Pm.

For the above purpose, the second touch sensing circuit 210-2 may include a first switch SW1 for receiving the short touch driving signal TDS_S and a second switch SW2 for receiving the common voltage of DC level Vcom_DC in the second switch circuit 212-2. However, as described below, since the common voltage of DC level Vcom_DC may be supplied through the second touch signal control circuit 214-2, the second switch SW2 in the second switch circuit 212-2 may be omitted.

In this case, the second touch signal control circuit 214-2 may include an operational amplifier that receives the touch sensing signal TSS transmitted from the short touch electrodes through a third switch SW3. The operational amplifier may transmit the comparison result between the touch sensing signal TSS received through an inverting input terminal (−) and the common voltage of DC level Vcom_DC received through a non-inverting input terminal (+) to the touch controller 220 for detecting the touch presence or not or the touch coordinates.

However, the above description illustrated the common voltage of DC level Vcom_DC supplied to the second switch circuit 212-2 or the second touch signal control circuit 214-2 in order to describe the signal supplied to the short touch electrodes during the mutual-capacitance sensing period Pm. On the other hand, a pulse type common voltage Vcom may be supplied during the self-capacitance sensing period Ps or the display driving period Td. That is, the common voltage Vcom supplied to the short touch electrodes may be a pulse type voltage or a DC level voltage according to time.

Figure 18:
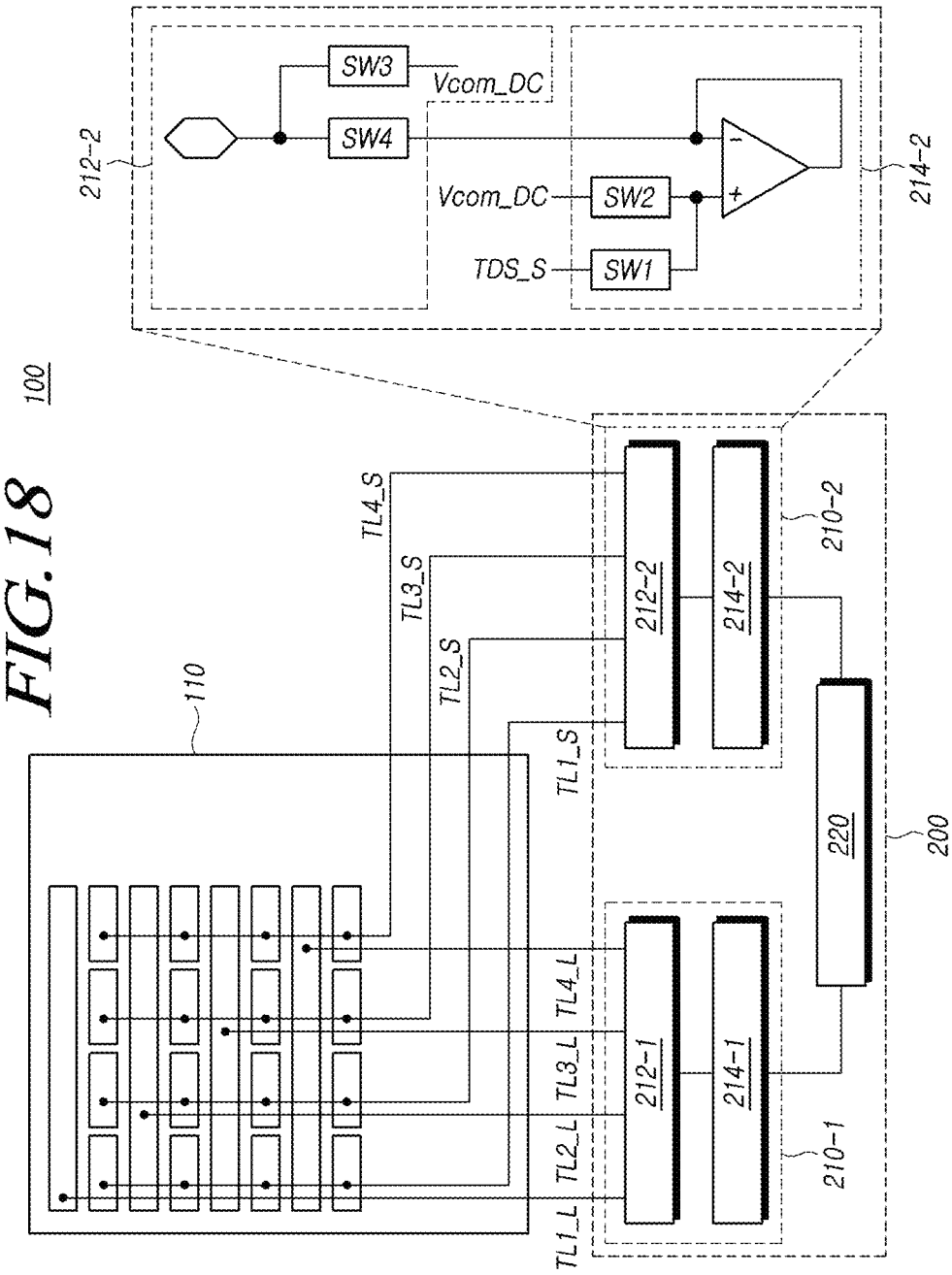
FIG. 18 illustrates a circuit diagram in configuration of supplying a short touch driving signal into a second touch signal control circuit constituting a second touch sensing circuit in a touch display device according to embodiments.

FIG. 18 illustrates a circuit diagram in configuration of supplying a short touch driving signal into a second touch signal control circuit constituting a second touch sensing circuit in a touch display device according to embodiments.

Referring to FIG. 18, the touch circuit 200 in the touch display device 100 according to embodiments may include the first touch sensing circuit 210-1 for supplying the long touch driving signals TDS_L to the long touch electrodes, the second touch sensing circuit 210-2 for supplying the short touch driving signals TDS_S to the short touch electrodes, and the touch controller 220.

At this time, since the self-capacitance sensing operation is performed for the long touch electrodes and the short touch electrodes during the self-capacitance sensing period Ps, the long touch driving signals TDS_L and the short touch driving signals TDS_S are supplied together to the long touch electrodes and the short touch electrodes respectively.

On the other hand, the long touch driving signals TDS_L are supplied to the long touch electrodes, but the common voltage of DC level Vcom_DC instead of the short touch driving signal TDS_S may be supplied to the short touch electrodes during the mutual-capacitance sensing period Pm.

For the above purpose, the second touch sensing circuit 210-2 may connect the first switch SW1 for supplying the short touch driving signal TDS_S to the non-inverting input terminal (+) of the operational amplifier constituting the second touch signal control circuit 214-2 to the second switch SW2 for supplying the common voltage of DC level Vcom_DC.

Accordingly, the operational amplifier may compare the touch sensing signal TSS received through the inverting input terminal (−) via the fourth switch SW4 with the short touch driving signals TDS_S or the common voltage of DC level Vcom_DC supplied for the non-inverting input terminal (+), and may transmit the comparison result to the touch controller 220 for detecting the touch presence or not or the touch coordinates.

In this case, the second switch circuit 212-2 may transmit the common voltage of DC level Vcom_DC to the short touch electrodes through the third switch SW3 during the mutual-capacitance sensing period Pm. At this time, since the common voltage of DC level Vcom_DC may be supplied through the second touch signal control circuit 214-2, the third switch SW3 in the second switch circuit 212-2 may be omitted.

Similarly, the above description illustrated that the common voltage of DC level Vcom_DC is supplied to the second switch circuit 212-2 or the second touch signal control circuit 214-2 in order to describe the signal supplied to the short touch electrodes during the mutual-capacitance sensing period Pm. The pulse type common voltage Vcom may be supplied during the self-capacitance sensing period Ps or the display driving period Td.

On the other hand, the above description illustrated a structure in which the self-capacitance sensing operation and the mutual-capacitance sensing operation are performed simultaneously for a touch electrode group TEG with the woven type touch electrode structure. However, the self-capacitance sensing operation and the mutual-capacitance sensing operation may be controlled by connecting one or more touch electrode groups TEG to different multiplexers and sequentially driving each multiplexer or simultaneously driving the plurality of multiplexers.

Figure 19:
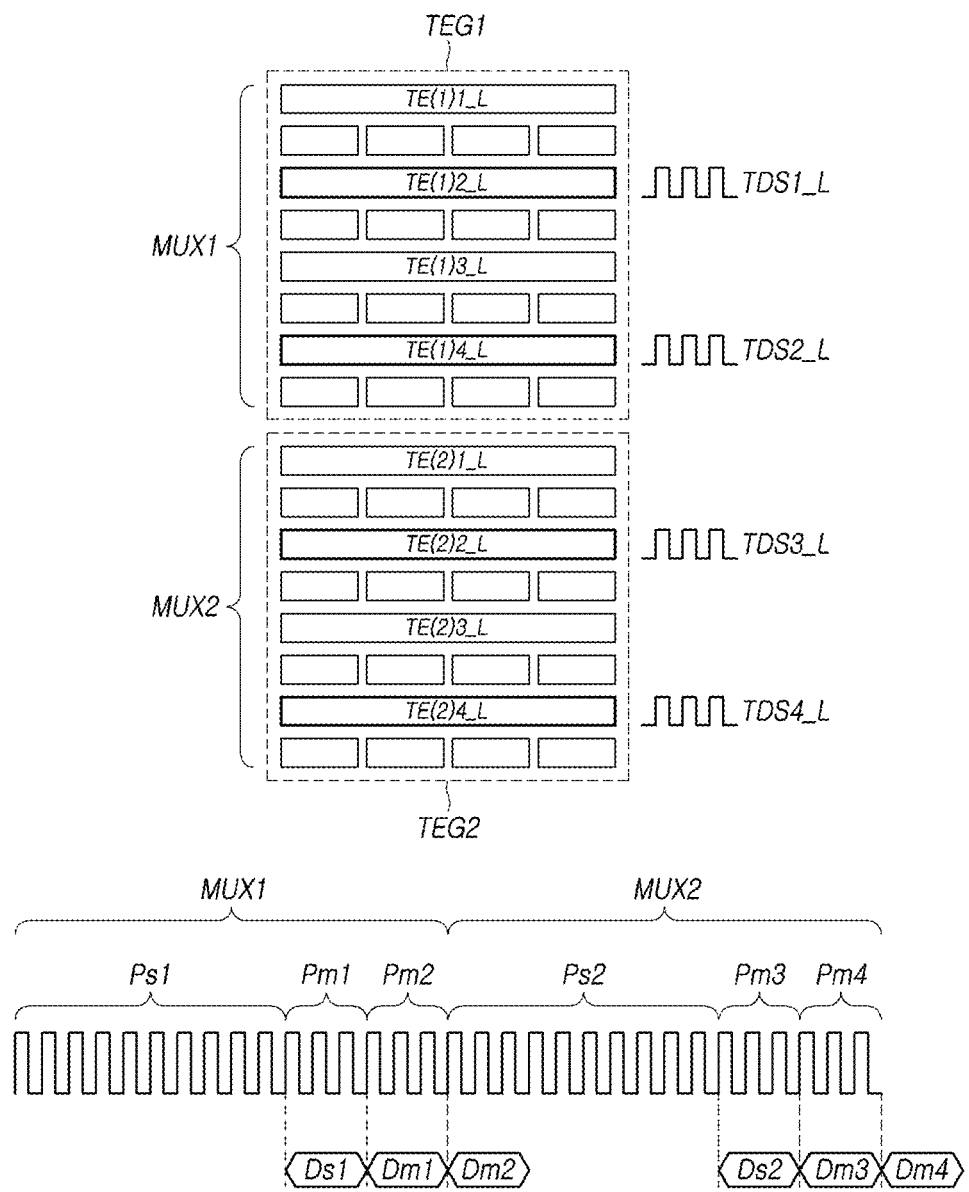
FIG. 19 illustrates an exemplary diagram of a touch electrode group and a signal waveform in case that each multiplexer is sequentially driven in a state in which one or more touch electrode groups are connected to different multiplexers in a touch display device according to embodiments.

FIG. 19 illustrates an exemplary diagram of a touch electrode group and a signal waveform in case that each multiplexer is sequentially driven in a state in which one or more touch electrode groups are connected to different multiplexers in a touch display device according to embodiments.

Referring to FIG. 19, the touch display device 100 according to embodiments may perform the self-capacitance sensing operation and the mutual-capacitance sensing operation for a touch electrode group block composed of one or more touch electrode groups TEG by dividing the plurality of touch electrode groups TEG constituting the display panel 110 into one or more touch electrode group blocks and connecting a multiplexer to each of the divided touch electrode group block.

Here, it illustrates a case in which a touch electrode group is connected to a multiplexer. The self-capacitance sensing operation and the mutual-capacitance sensing operation may be performed by driving sequentially the first multiplexer MUX1 connected to the first touch electrode group TEG1 and the second multiplexer MUX2 connected to the second touch electrode group TEG2.

That is, the self-capacitance sensing operation for the long touch electrodes and the short touch electrodes in the first touch electrode group TEG1 may be performed during the self-capacitance sensing period Ps1 with the first multiplexer MUX1 turned on.

Then, the long touch driving signal TDS2_L is supplied to the second long touch electrode TE(1)2_L selected in the first touch electrode group TEG1, and the short touch sensing signal TSS is received from the short touch electrode during the first mutual-capacitance sensing period Pm1.

And then, the long touch driving signal TDS4_L is supplied to the fourth long touch electrode TE(1)4_L selected in the first touch electrode group TEG1, and the short touch sensing signal TSS is received from the short touch electrode during the second mutual-capacitance sensing period Pm2.

Here, an example is illustrated in a case that the long touch driving signals TDS2_L, TDS4_L are sequentially supplied to the second long touch electrode TE(1)2_L and the fourth long touch electrode TE(1)4_L among the four long touch electrodes TE(1)1_L-TE(1)4_L in the first touch electrode group TEG1 with a 4×4 woven type touch electrode structure. And, the long touch electrodes to which the long touch driving signals are supplied may be selected in various orders.

At this time, the touch display device 100 may receive the touch sensing signal TSS for the short touch electrodes, and at the same time, convert the touch sensing signal TSS received in the previous self-capacitance sensing period Ps into a digital sensing data Ds1 to transmit it to the touch controller 220 during the first mutual-capacitance sensing period Pm1. Likewise, the touch display device 100 may convert the touch sensing signal TSS received in the first mutual-capacitance sensing period Pm1 into a digital sensing data Dm1 and transmit it to the touch controller 220 during the second mutual-capacitance sensing period Pm2.

As described above, when the self-capacitance sensing operation and the mutual-capacitance sensing operation for the touch electrode group TEG1 connected to the first multiplexer MUX1 are completed, the self-capacitance sensing operation and the mutual-capacitance sensing operation for the touch electrode group TEG2 connected to the second multiplexer MUX2 may be performed by turning on the second multiplexer MUX2.

At this time, when a plurality of touch electrode groups are connected to a multiplexer, the self-capacitance sensing operation and the mutual-capacitance sensing operation are sequentially performed for the plurality of touch electrode groups connected to a turned-on multiplexer, and then the self-capacitance sensing operation and the mutual-capacitance sensing operation for a plurality of touch electrode groups connected to the other multiplexer may be sequentially performed.

Figure 20:
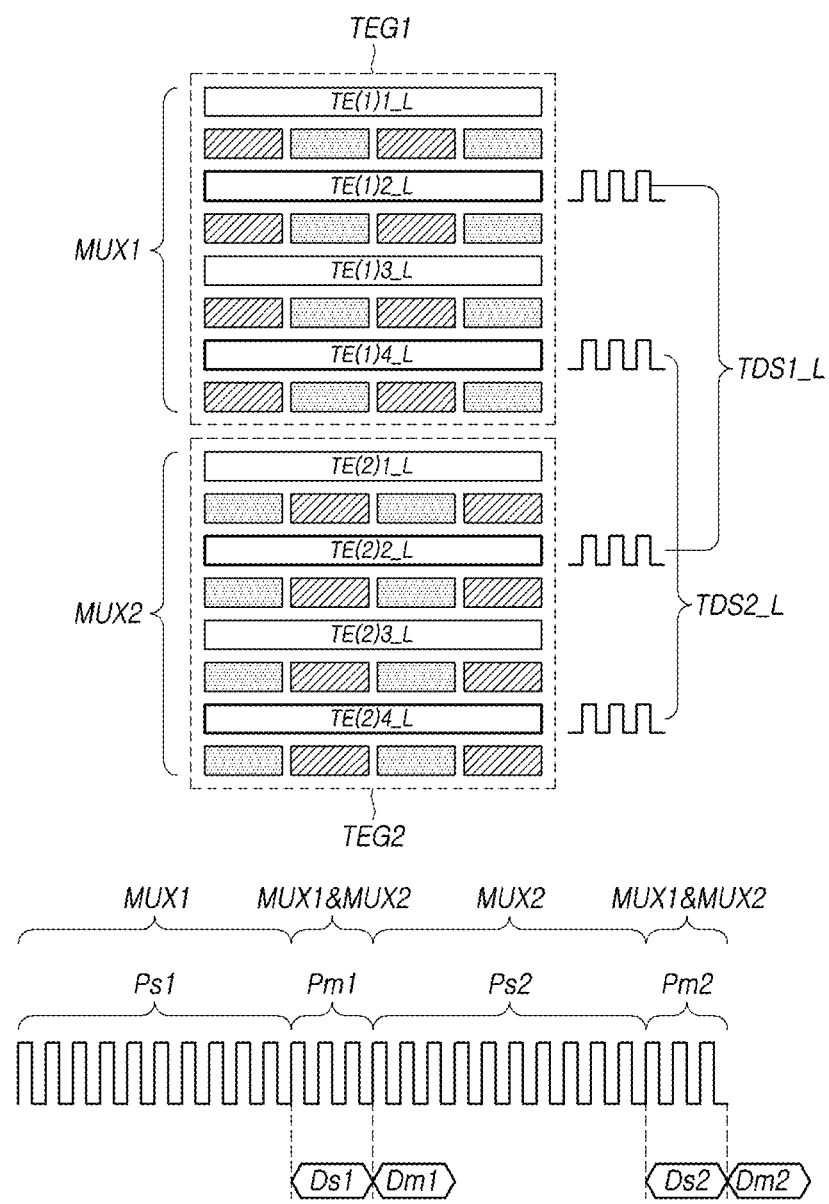
FIG. 20 illustrates an exemplary diagram of a touch electrode group and a signal waveform in case that a plurality of multiplexers are driven simultaneously in a state in which one or more touch electrode groups are connected to different multiplexers in a touch display device according to embodiments.

FIG. 20 illustrates an exemplary diagram of a touch electrode group and a signal waveform in case that a plurality of multiplexers are driven simultaneously in a state in which one or more touch electrode groups are connected to different multiplexers in a touch display device according to embodiments.

Referring to FIG. 20, the touch display device 100 according to embodiments may simplify the mutual-capacitance sensing operation by connecting a multiplexer to each of the touch electrode group blocks composed of one or more touch electrode groups and simultaneously turning on a plurality of multiplexers in the mutual-capacitance sensing period. In this case, since the self-capacitance sensing operation is performed for each of the long touch electrodes and the short touch electrodes, the self-capacitance sensing period will be individually performed for each multiplexer.

Here, it illustrates a case of the mutual-capacitance sensing operation by simultaneously driving the first multiplexer MUX1 connected to the first touch electrode group TEG1 and the second multiplexer MUX2 connected to the second touch electrode group TEG2.

First, the self-capacitance sensing operation is performed for the long touch electrodes and the short touch electrodes in the first touch electrode group TEG1 connected to the first multiplexer MUX1 during the first self-capacitance sensing period Ps1.

Then, in a state in which the first multiplexer MUX1 and the second multiplexer MUX2 are turned on together during the first mutual-capacitance sensing period Pm1, the long touch driving signal TDS2_L is simultaneously supplied to a long touch electrode (e.g., TE(1)2_L) selected in the first touch electrode group TEG1 connected to the first multiplexer MUX1 and to another long touch electrode (e.g., TE(2)2_L) selected in the second touch electrode group TEG2 connected to the second multiplexer MUX2. And then, the touch sensing signal TSS is received from the short touch electrodes of the first touch electrode group TEG1 and the second touch electrode group TEG2.

At this time, the short touch electrodes receiving the touch sensing signal TSS in the first mutual-capacitance sensing period Pm1 would be preferable to select from the short touch electrodes located at different columns in the first touch electrode group TEG1 and the second touch electrode group TEG2 since the short touch electrodes located at the same column may be connected to same touch channel. For example, the touch sensing signals TSS are received from the short touch electrodes located at different positions in column direction for each of the touch electrode group blocks.

For example, when the first multiplexer MUX1 and the second multiplexer MUX2 are turned on together, the touch sensing signal may be received from the short touch electrodes located at first column and third column for the first multiplexer MUX1 and the touch sensing signal may be received from the short touch electrodes located at second column and fourth column for the second multiplexer MUX2 during the first mutual-capacitance sensing period Pm1.

After the termination of the first mutual-capacitance sensing period Pm1, the self-capacitance sensing operation may be performed for the long touch electrodes and the short touch electrodes in the second touch electrode group TEG2 connected to the second multiplexer MUX2 during the second self-capacitance sensing period Ps2.

Then, the long touch driving signal TDS2_L may be supplied to the long touch electrodes (e.g., TE(1)4_L and TE(2)4_L) selected in the first touch electrode group TEG1 and the second touch electrode group TEG2, and the short touch sensing signal TSS may be received from the short touch electrodes by turning together on the first multiplexer MUX1 and the second multiplexer MUX2 during the second mutual-capacitance sensing period Pm2.

At this time, it is preferable that the long touch electrodes (e.g., TE(1)4_L and TE(2)4_L) to which the long touch driving signal TDS2_L is supplied in the second mutual-capacitance sensing period Pm2 are selected differently from the long touch electrodes (e.g., TE(1)2_L and TE(2)2_L) to which the long touch driving signal TDS1_L is supplied in the first mutual-capacitance sensing period Pm1.

Likewise, the touch display device 100 may receive the touch sensing signal TSS from the short touch electrodes during the first mutual-capacitance sensing period Pm1, and at the same time, convert the touch sensing signal TSS received in the previous self-capacitance sensing period Ps1 into a digital sensing data Ds1 for supplying it to the touch controller 220.

Meanwhile, the touch display device 100 according to embodiments may perform sequentially the self-capacitance sensing operation and the mutual-capacitance sensing operation every touch sensing period Tt, but may perform only self-capacitance sensing operation to increase the efficiency of touch sensing operation when the multi-touch or touch ghost does not occur.

Figure 21:
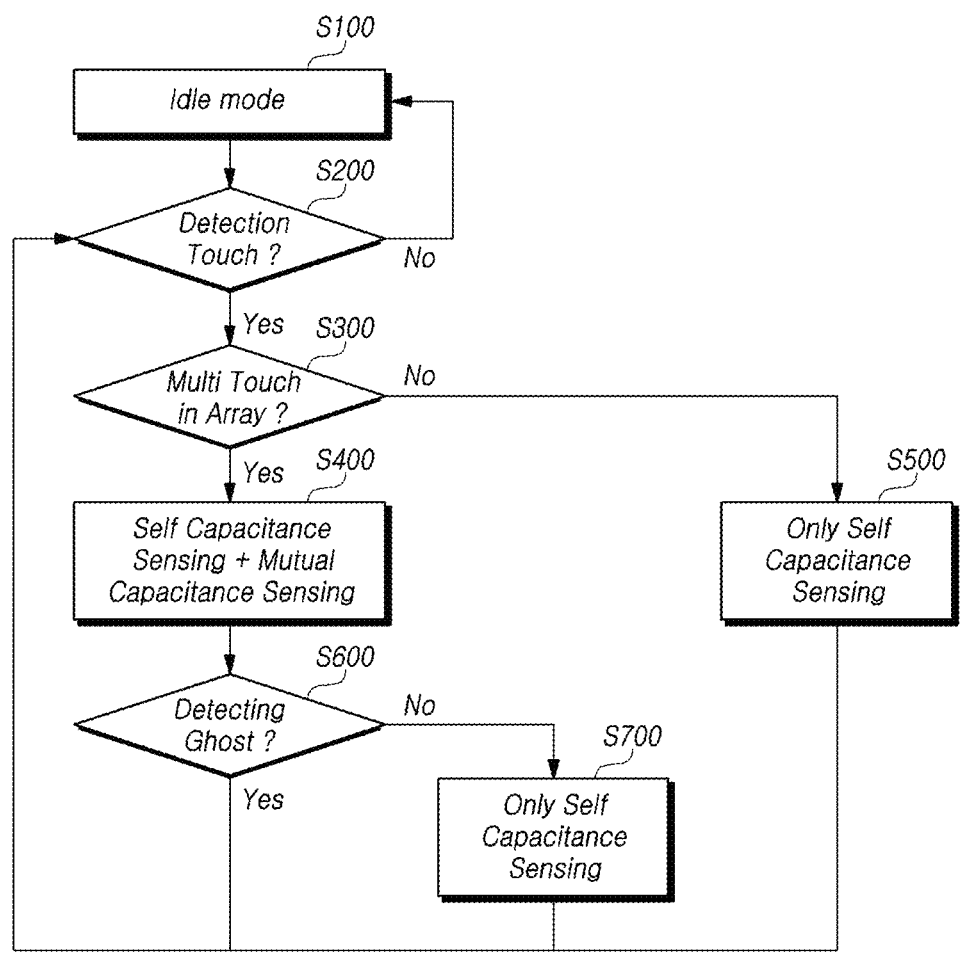
FIG. 21 illustrates an exemplary flowchart of a touch driving method for a display panel on which a plurality of woven type touch electrodes are disposed in a touch display device according to embodiments.

FIG. 21 illustrates an exemplary flowchart of a touch driving method for a display panel on which a plurality of woven type touch electrodes are disposed in a touch display device according to embodiments.

Referring to FIG. 21, a touch driving method for the display panel 110 on which the woven type touch electrodes are disposed in the touch display device 100 according to the embodiments may be in an idle mode S100 waiting for a touch input when a user's touch input does not exist.

When a touch input is detected for a specific touch electrode group TEG in which the woven type touch electrodes are formed in the display panel 110 of the idle mode S200, the touch display device 100 determines whether the touch input detected in the touch electrode group TEG is multi-touch in array or single-touch S300. In the case of multi-touch, the self-capacitance sensing operation and the mutual-capacitance sensing operation are performed sequentially for the touch electrode group TEG in which the touch input is sensed during the touch sensing period Tt S400.

On the other hand, in the case of the single-touch, the self-capacitance sensing operation is only performed during the touch sensing period Tt S500.

Meanwhile, even if the multi-touch is detected, the self-capacitance sensing operation may be only performed when no touch ghost occurs during the touch sensing period Tt S700 by determining whether a touch ghost occurs in the touch electrode group TEG in which the touch input is sensed S600. If a touch ghost occurs, the corresponding touch input will be ignored and a new touch input will be detected.

As described above, the efficiency of touch sensing operation is improved by only performing the self-capacitance sensing operation for the touch electrode group TEG when the touch input for the touch electrode group TEG is the single-touch or no touch ghost occurs.

On the other hand, since the touch display device 100 according to embodiments performs the self-capacitance sensing operation and the mutual-capacitance sensing operation together during the touch sensing period Tt, it is possible to improve the detection accuracy of the touch presence or not or the touch coordinates due to combine the self-capacitance sensing signal and the mutual-capacitance sensing signal by the touch controller 220.

FIG. 22 illustrates a conceptual diagram of detecting a touch by combining a self-capacitance sensing signal and a mutual-capacitance sensing signal in a touch display device according to embodiments.

Referring to FIG. 22, the touch display device 100 according to embodiments may include together the self-capacitance sensing period Ps in which the self-capacitance sensing operation is performed and the mutual-capacitance sensing period Pm in which the mutual-capacitance sensing operation is performed within the touch sensing period Tt.

In this case, the touch controller 220 may store the touch sensing signal TSS received from the long touch electrodes and the short touch electrodes respectively, during the self-capacitance sensing period Ps according to coordinates of the touch electrodes.

In addition, the touch controller 220 may store the touch sensing signal TSS received from the short touch electrodes during the mutual-capacitance sensing period Pm according to coordinates of the touch electrodes.

Accordingly, the touch controller 220 may generate final touch detection results by adding the touch sensing signal TSS received during the self-capacitance sensing period Ps and the touch sensing signal TSS received during the mutual-capacitance sensing period Pm by coordinates of each touch electrode.

Therefore, the touch display device 100 according to embodiments may improve the detection accuracy of the touch presence or not and the touch coordinates than a case that generates a touch detection result by performing only the self-capacitance sensing operation or only the mutual-capacitance sensing operation.

It will be apparent to those skilled in the art that various modifications and variations can be made in the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
a display panel including a touch electrode group in which a plurality of long touch electrodes with long length in a first direction and a plurality of short touch electrodes with short length in the first direction are alternately arranged in a second direction; and
a touch circuit configured to sequentially perform a self-capacitance sensing operation and a mutual-capacitance sensing operation for the touch electrode group,
wherein the touch circuit includes:
a first touch sensing circuit configured to supply a long touch driving signal to the long touch electrode and receive a touch sensing signal from the long touch electrode through long touch lines,
a second touch sensing circuit configured to supply a short touch driving signal to the short touch electrode or receive the touch sensing signal from the short touch electrode through short touch lines, and
a touch controller configured to detect a touch presence or not or a touch position based on the touch sensing signal transmitted from the first touch sensing circuit and the second touch sensing circuit,
wherein the first touch sensing circuit includes:
a first switch circuit electrically connected to the long touch electrode and configured to switch a transmission path of the long touch driving signal and the touch sensing signal; and
a first touch signal control circuit configured to supply the long touch driving signal to the first switch circuit or receive the touch sensing signal from the first switch circuit.

2. The touch display device according to claim 1, wherein the touch electrode group includes:
N (N is an integer of 2 or more) long touch electrodes among the plurality of long touch electrodes, the N long touch electrodes are arranged parallel in the second direction; and
M (M is integer of 2 or more) short touch electrode blocks in which a plurality of short touch electrodes disposed in the second direction are electrically connected to a same touch line.

3. The touch display device according to claim 1, wherein the second touch sensing circuit includes:
a second switch circuit electrically connected to the short touch electrode and configured to switch a transmission path of the short touch driving signal and the touch sensing signal; and
a second touch signal control circuit configured to supply the short touch driving signal to the second switch circuit or to receive the touch sensing signal from the second switch circuit.

4. The touch display device according to claim 3, wherein the second switch circuit includes:
a first switch configured to receive the short touch driving signal; and
a third switch electrically connected to the second touch signal control circuit;
wherein the second touch signal control circuit includes an operational amplifier in which a common voltage is supplied to a non-inverting input terminal and an inverting input terminal is connected to the third switch.

5. The touch display device according to claim 3, wherein the second touch signal control circuit includes an operational amplifier in which a non-inverting input terminal is electrically connected simultaneously to a first switch configured to receive the short touch driving signal and a second switch configured to receive a common voltage, and an inverting input terminal is electrically connected to the second switch circuit.

6. The touch display device according to claim 1, wherein the self-capacitance sensing operation is performed by suppling the long touch driving signal and the short touch driving signal to the long touch electrode and the short touch electrode respectively, and then receiving the touch sensing signal; and
wherein the mutual-capacitance sensing operation is performed by supplying the long touch driving signal to at least one of long touch electrodes selected from the touch electrode group, and receiving the touch sensing signal from a plurality of short touch electrodes selected from the touch electrode group.

7. The touch display device according to claim 6, wherein the at least one long touch electrode selected from the touch electrode group is a long touch electrode close to adjacent touch electrode group in the second direction.

8. The touch display device according to claim 6, wherein the plurality of short touch electrodes selected from the touch electrode group are a plurality of short touch electrodes located at outer area of the touch electrode group.

9. The touch display device according to claim 1, wherein the touch circuit is configured to receive the long touch driving signal and the short touch driving signal from a touch power integrated circuit.

10. The touch display device according to claim 1, wherein the touch circuit is configured to generate the long touch driving signal and the short touch driving signal using a touch driving signal received from a touch power integrated circuit.

11. The touch display device according to claim 1, wherein the display panel is divided into a plurality of touch electrode group blocks each including at least one of touch electrode group and the divided touch electrode group block is connected to a multiplexer, and
wherein the touch electrode group block is performed sequentially the self-capacitance sensing operation and the mutual-capacitance sensing operation according to a control of the multiplexer.

12. The touch display device according to claim 1, wherein the display panel is divided into a plurality of touch electrode group blocks each including at least one of touch electrode group and the divided touch electrode group block is connected to a multiplexer, and
wherein the self-capacitance sensing operation and the mutual-capacitance sensing operation is performed sequentially by supplying long touch driving signals to the plurality of touch electrode group blocks according to a control of the multiplexer.

13. The touch display device according to claim 12, when the long touch driving signal is simultaneously supplied to the plurality of touch electrode group blocks, the touch sensing signals are received from the short touch electrodes located at different positions in the second direction for each of the touch electrode group blocks.

14. The touch display device according to claim 1, wherein the mutual-capacitance sensing operation is performed when a multi-touch or touch ghost is detected.

15. The touch display device according to claim 1, wherein the touch circuit is configured to detect touch presence or not or touch coordinates by adding a result of the self-capacitance sensing operation and a result of the mutual-capacitance sensing operation.

16. A touch circuit configured to detect a touch of a display panel including a touch electrode group in which a plurality of long touch electrodes with long length in a first direction and a plurality of short touch electrodes with short length in the first direction are alternately arranged in a second direction, comprising:
- a first touch sensing circuit configured to supply a touch driving signal to the long touch electrode and to receive a touch sensing signal from the long touch electrode through long touch lines,
- a second touch sensing circuit configured to supply the touch driving signal to the short touch electrode or to receive the touch sensing signal from the short touch electrode through short touch lines, and
- a touch controller configured to sequentially perform a self-capacitance sensing operation and a mutual-capacitance sensing operation for the touch electrode group, and to detect a touch presence or not and a touch position based on the touch sensing signal transmitted from the first touch sensing circuit and the second touch sensing circuit, wherein the first touch sensing circuit includes:
- a first switch circuit electrically connected to the long touch electrode and configured to switch a transmission path of the long touch driving signal and the touch sensing signal; and
- a first touch signal control circuit configured to supply the long touch driving signal to the first switch circuit or receive the touch sensing signal from the first switch circuit.

* * * * *